(12) United States Patent
Neginhal et al.

(10) Patent No.: US 9,503,321 B2
(45) Date of Patent: Nov. 22, 2016

(54) DYNAMIC ROUTING FOR LOGICAL ROUTERS

(71) Applicant: Nicira, Inc., Palo Alto, CA (US)

(72) Inventors: Srinivas Neginhal, Santa Clara, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 44 days.

(21) Appl. No.: 14/222,561

(22) Filed: Mar. 21, 2014

(65) Prior Publication Data

US 2015/0271011 A1    Sep. 24, 2015

(51) Int. Cl.
*H04L 12/28* (2006.01)
*H04L 12/24* (2006.01)
*H04L 12/713* (2013.01)
*H04L 12/715* (2013.01)

(52) U.S. Cl.
CPC ......... *H04L 41/0803* (2013.01); *H04L 45/586* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 5,504,921 | A | 4/1996 | Dev et al. |
| 5,550,816 | A | 8/1996 | Hardwick et al. |
| 5,751,967 | A | 5/1998 | Raab et al. |
| 6,006,275 | A | 12/1999 | Picazo, Jr. et al. |
| 6,104,699 | A | 8/2000 | Holender et al. |
| 6,219,699 | B1 | 4/2001 | McCloghrie et al. |
| 6,359,909 | B1 | 3/2002 | Ito et al. |
| 6,456,624 | B1 | 9/2002 | Eccles et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,941,487 | B1 | 9/2005 | Balakrishnan et al. |
| 6,950,428 | B1 | 9/2005 | Horst et al. |
| 6,963,585 | B1 | 11/2005 | Le Pennec et al. |
| 6,999,454 | B1 | 2/2006 | Crump |
| 7,046,630 | B2 | 5/2006 | Abe et al. |
| 7,197,572 | B2 | 3/2007 | Matters et al. |
| 7,200,144 | B2 | 4/2007 | Terrell et al. |

(Continued)

FOREIGN PATENT DOCUMENTS

| | | |
|---|---|---|
| EP | 1653688 | 5/2006 |
| JP | 2003-069609 | 3/2003 |

(Continued)

OTHER PUBLICATIONS

U.S. Appl. No. 14/222,557, filed Mar. 21, 2014, Neginhal, Srinivas, et al.

(Continued)

*Primary Examiner* — Duc C Ho
(74) *Attorney, Agent, or Firm* — Adeli LLP

(57) ABSTRACT

Some embodiments provide a method for a network controller that manages a first logical router of a logical network that is implemented across several managed network elements. The method receives input data specifying a first route for a second logical router. Based on a connection between the first logical router and a second logical router in the logical network, the method dynamically generates a second route for the first logical router based on the first route. The method distributes data to implement the first logical router, including the second route, to a set of the managed network elements.

23 Claims, 20 Drawing Sheets

(56) References Cited

U.S. PATENT DOCUMENTS

| | | |
|---|---|---|
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,559,324 B1 * | 10/2013 | Brandwine ......... H04L 12/1432 370/252 |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,660,129 B1 | 2/2014 | Brendel et al. |
| 8,958,298 B2 | 2/2015 | Zhang et al. |
| 9,059,999 B2 | 6/2015 | Koponen et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0046531 A1 | 2/2010 | Louati et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2011/0016215 A1 | 1/2011 | Wang |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0131643 A1 | 5/2012 | Cheriton |

(56) References Cited

U.S. PATENT DOCUMENTS

| | | | |
|---|---|---|---|
| 2012/0236734 | A1 | 9/2012 | Sampath et al. |
| 2013/0007740 | A1 | 1/2013 | Kikuchi et al. |
| 2013/0044636 | A1 | 2/2013 | Koponen et al. |
| 2013/0044641 | A1 | 2/2013 | Koponen et al. |
| 2013/0058229 | A1 | 3/2013 | Casado et al. |
| 2013/0058335 | A1 | 3/2013 | Koponen et al. |
| 2013/0058350 | A1 | 3/2013 | Fulton |
| 2013/0058353 | A1* | 3/2013 | Koponen ............ H04L 12/4633 370/401 |
| 2013/0103818 | A1 | 4/2013 | Koponen et al. |
| 2013/0142048 | A1 | 6/2013 | Gross et al. |
| 2013/0148541 | A1 | 6/2013 | Zhang et al. |
| 2013/0148542 | A1 | 6/2013 | Zhang et al. |
| 2013/0148543 | A1 | 6/2013 | Koponen et al. |
| 2013/0148656 | A1 | 6/2013 | Zhang et al. |
| 2013/0151661 | A1 | 6/2013 | Koponen et al. |
| 2013/0151676 | A1 | 6/2013 | Thakkar et al. |
| 2013/0266007 | A1 | 10/2013 | Kumbhare et al. |
| 2013/0329548 | A1 | 12/2013 | Nakil et al. |
| 2013/0332602 | A1 | 12/2013 | Nakil et al. |
| 2013/0332619 | A1 | 12/2013 | Xie et al. |
| 2013/0339544 | A1 | 12/2013 | Mithyantha |
| 2014/0173093 | A1 | 6/2014 | Rabeela et al. |
| 2014/0195666 | A1 | 7/2014 | Dumitriu et al. |
| 2014/0229945 | A1 | 8/2014 | Barkai et al. |
| 2015/0063360 | A1 | 3/2015 | Thakkar et al. |
| 2015/0103838 | A1* | 4/2015 | Zhang .................... H04L 45/04 370/401 |
| 2015/0188770 | A1 | 7/2015 | Naiksatam et al. |
| 2015/0222550 | A1* | 8/2015 | Anand .................... H04L 47/11 370/235 |
| 2015/0263952 | A1* | 9/2015 | Ganichev ............ H04L 41/0813 370/389 |
| 2015/0271303 | A1 | 9/2015 | Neginhal et al. |

FOREIGN PATENT DOCUMENTS

| | | |
|---|---|---|
| JP | 2003-124976 | 4/2003 |
| JP | 2003-318949 | 11/2003 |
| WO | WO 2005/112390 | 11/2005 |
| WO | WO 2008/095010 | 8/2008 |
| WO | WO 2013/184846 | 12/2013 |
| WO | WO 2015/142404 | 9/2015 |

OTHER PUBLICATIONS

PCT/US2014/072877, filed Dec. 30, 2014, Nicira, Inc.
International Search Report and Written Opinion of PCT/US2014/072877, mailed date Jun. 5, 2015, Nicira, Inc.
Agarwal, Sugam, et al., "Traffic Engineering in Software Defined Networks," 2013 Proceedings IEEE INFOCOM, Apr. 14, 2013, pp. 2211-2219, Bell Labs, Alcatel-Lucent, Holmdel, NJ, USA.
Al-Fares, Mohammad, et al., "A Scalable, Commodity Data Center Network Architecture," Aug. 17-22, 2008, pp. 63-74, Seattle, Washington, USA.
Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Anwer, Muhammad Bilal, et al., "Building A Fast, Virtualized Data Plane with Programmable Hardware," Aug. 17, 2009, pp. 1-8, VISA'09, Barcelona, Spain, ACM.
Author Unknown , "Cisco VN-Link: Virtualization-Aware Networking," Month Unknown, 2009, 10 pages, Cisco Systems, Inc.
Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).
Author Unknown , "HP Web Jetadmin Integration into HP OpenView Network Node Manager," Feb. 2004, pp. 1-12, HP.
Author Unknown , "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown , "Open vSwitch, An Open Virtual Switch," Dec. 30, 2010, 2 pages, Cisco Systems, Inc.
Author Unknown , "Single Root I/O Virtualization and Sharing Specification, Revision 1.0," Sep. 11, 2007, pp. 1-84, PCI-SIG.
Author Unknown , "VMware for Linux Networking Support," month unknown, 1999, 5 pp., VMware, Inc.
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unknown, 2004, pp. 1-4, Hewlett-Packard Development Company, HP.
Author Unknown, "Intel 82599 10 Gigabit Ethernet Controller: Datasheet, Revision: 2.73," Dec. 2011, 930 pages, Intel Corporation.
Author Unknown, "Introduction to VMware Infrastructure: ESX Server 3.5, ESX Server 3i version 3.5, VirtualCenter 2.5," Dec. 2007, pp. 1-46, Revision: 20071213, VMware, Inc., Palo Alto, California, USA.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Berde, Pankaj, et al., "ONOS Open Network Operating System An Open-Source Distributed SDN OS," Dec. 19, 2013, 34 pages.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," month unknown, 2008, pp. 1-6.
Casado, Martin, et al., "SANE: A Protection Architecture for Enterprise Networks," Proceedings of the 15th USENIX Security Symposium, Jul. 31, 2006, pp. 137-151.
Casado, Martin, et al., "Scaling Out: Network Virtualization Revisited," month unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Saurav, et al. "Simple Unified Control for Packet and Circuit Networks," Month Unknown, 2009, pp. 147-148, IEEE.
Das, Saurav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

(56) References Cited

OTHER PUBLICATIONS

Davoli, Renzo, "VDE: Virtual Distributed Ethernet," Feb. 2005, pp. 1-8, TRIDENTCOM'05, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. (US Provisional U.S. Appl. No. 61/514,990), filed Aug. 4, 2011.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Foster, Nate, et al., "Frenetic: A Network Programming Language," ICFP, Sep. 19-21, 2011, 13 pages, Tokyo, Japan.
Greenberg, Albert, et al., "A Clean Slate 4D Approach to Network Control and Management," Oct. 2005, 12 pp., vol. 35, No. 5, ACM SIGCOMM Computer Communication Review.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," Jul. 2008, pp. 105-110, vol. 38, No. 3, ACM SIGCOMM Computer communication Review.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Hamilton, James, et al., "Datacenter Networks Are In My Way," Principals of Amazon Series, Oct. 28, 2010, pp. 1-14.
Handley, Mark, et al., "Designing Extensible IP Router Software," Proc. Of NSDI, May 2005, 14 pages.
Handley, Mark, et al., "XORP: An Open Platform for Network Research," First Workshop on Hot Topics in Networks, Princeton, New Jersey, Oct. 22-29, 2002, pp. 1-5, International Computer Science Institute, Center for Internet Research, Berkeley, California, USA.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," month unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kim, Chnaghoon, et al., "Revisiting Route Caching: The World Should be Flat," in Proc. Of PAM, Month Unknown, 10 pages.
Kohler, Eddie, et al., "The Click Modular Router," ACM Trans. On Computer Systems, Aug. 2000, pp. 1-34, vol. 18, No. 3.
Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 24 pages.
Lakshminarayanan, Karthik, et al., "Routing as a Service," Month Unknown, 2004, pp. 1-15, Berkeley, California.
Loo, Boon Thau, et al., "Declarative Routing: Extensible Routing with Declarative Queries," In Proc. Of SIGCOMM, Aug. 21-26, 2005, 12 pages, Philadelphia, PA, USA.
Loo, Boon Thau, et al., "Implementing Declarative Overlays," In Proc. Of SOSP, Oct. 2005, 16 pages. Brighton, UK.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, 14 pages, ACM, Portland, Oregon, USA.
Mann, Vijay, etal., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
McKeown, Nick, et al., "OpenFlow: Enabling Innovation in Campus Networks," Mar. 14, 2008, 6 pages.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. Of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May, 2008, pp. 1-87.
Pettit, Justin, et al., "Virtual Switching in an Era of Advanced Edges," Sep. 2010, 7 pages.
Pfaff, Ben, et al., "Extending Networking into the Virtualization Layer," Proc. Of HotNets, Oct. 2009, pp. 1-6.
Rosen, E., et al., "Applicability Statement for BGP/MPLS IP Virtual Private Networks (VPNs)," The Internet Society, RFC 4365, Feb. 2006, pp. 1-32.
Shenker, Scott, et al., "The Future of Networking, and the Past of Protocols," Dec. 2, 2011, pp. 1-30, USA.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," month unknown, 2009, 6 pp., Proceedings of HotNets.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-41, The Internet Society RFC(3746).
Yu, Minlan, et al., "Scalable Flow-Based Networking with DIFANE," Aug. 2010, pp. 1-16, In Proceedings of SIGCOMM.
Portions of prosecution history of U.S. Appl. No. 14/222,557, filed Mar. 9, 2016, Neginhal, Srinivas, et al.

* cited by examiner

DYNAMIC ROUTING FOR LOGICAL ROUTERS

BACKGROUND

In traditional physical networking, routes come in three types—connected, static, and dynamic. Connected routes are those determined automatically based on local interface information. When an interface has an address configured in a subnet, then the router has a directly connected route to that subnet. Static routes are those manually configured at the router, and dynamic routes are learned from other routers via routing protocols (e.g., BGP, OSPF, IGP, etc.). As this may result in a router being presented with multiple routes for the same IP address, routers perform various processing techniques in order to choose between these routes.

Virtualized networks may also have routers, referred to as logical routers. Previous implementations of logical routers have only used connected routes, however, generated based on the IP prefix configured on the port of the logical router. Adding different types of routes to logical routers would pose the problem of requiring additional processing techniques for the logical routers, which may not be easily performed by the software forwarding elements often used to implement such logical routers.

BRIEF SUMMARY

Some embodiments provide a network control system that enables the connection of logical routers to each other, and the propagation of routes between the logical routers. In some embodiments, the logical routers are managed by one or more network controllers, which receive input to define the logical routers and compute additional route information for the logical routers. The computation of additional route information may include the propagation of routes specified for one logical router to a different logical router. In order for a logical router to be implemented in a physical network managed by a network controller of some embodiments, the network controller generates a routing table for the logical router and distributes the routing table to various elements in the network that implement the logical router. In some embodiments, the network controller distributes this routing table (including the dynamic route information) as (i) flow entries distributed to managed forwarding elements and (ii) data tuples defining a routing table for a virtualized container (e.g., a namespace) that operates as a L3 gateway for communicating with external networks.

In some embodiments, the network control system permits several different types of logical routers, which may have different predefined functionalities. Some embodiments arrange these different types of logical routers hierarchically. For example, in some embodiments, a first type of logical router connects to logical switches within a logical network while a second type of logical router provides connections between the shared virtualized infrastructure within which the logical routers are implemented and other networks external to the shared virtualized infrastructure.

Specifically, some embodiments enable tenant logical routers and provider logical routers for implementation within a virtualized network. The provider logical routers of some embodiments are managed by a datacenter provider to handle traffic in and out of a datacenter (e.g., a multi-tenant datacenter) within which various tenant logical networks are implemented. These provider logical routers, in some embodiments, may have connections to multiple tenant logical routers, as well as connections to external networks that are implemented in gateways (i.e., host machines that have a physical connection to routers in the external network). The tenant logical routers of some embodiments provide logical routing functionality to a single tenant logical network, allowing the tenant to connect multiple logical switches (to which the tenant machines (e.g., virtual machines) attach). The tenant logical routers, in some embodiments, may also connect to a provider logical router in order to receive traffic from, and send traffic to, external hosts. These restrictions on logical router functionality enable the datacenter administrator to manage, via the configuration of a provider logical router, the handling of traffic entering and exiting the datacenter.

In order to enable the connection of logical routers to each other, the network controllers enable dynamic routing between connected logical routers. In the general case, when a first logical router connects to a second logical router, the network controller automatically propagates routes from the first logical router to the second logical router, and vice versa. Thus, if the first logical router stores a connected route that routes network addresses in a particular subnet to a particular port of the logical router, the network controllers automatically populate the second logical router with a new route specifying the first logical router (i.e., a specific logical port of the first logical router) as a next hop for network addresses in the particular subnet. Similarly, connected routes for subnets attached to the second logical router are dynamically propagated to the first logical router as dynamic routes that specify the second logical router as a next hop.

In some embodiments, the routes that a network controller dynamically propagates include connected routes as well as manually entered static routes. The connected routes, described above, may be automatically generated for a logical router based on the configuration of the logical router (i.e., based on the attachment of a logical port to a particular subnet). The static routes, in some embodiments, are received by the network controller after manual input by an administrator of the logical network to which the logical router belongs. The static routes might specify, for a particular range of network addresses, a specific next hop address to which to send the packets. As an example, if a logical router has multiple connections to other logical routers, or connections to a physical network with multiple physical routers, the administrator might want to specify which of these routers should be the next hop for a particular range of network addresses.

The network controllers of some embodiments store connections between logical routers as part of the configuration data for the logical routers. Thus, when configuration state routing information for a first logical router is received, the network controller identifies whether to propagate this information to any other logical routers as dynamic routes. For the case of provider and tenant logical routers, some embodiments place restrictions on the routes that are dynamically propagated between logical routers. Specifically, when a tenant logical router connects to a provider logical router, some embodiments dynamically propagate the connected routes of the tenant logical router to the provider logical router, such that the provider logical router will send packets to the subnets specified by the connected routes to that tenant logical router. However, rather than dynamically propagating routes specifying information about the various other tenant networks that connect to the provider logical router, the network controller only propagates a dynamic default route to the tenant logical router that sends all packets not otherwise routed by more specific routes to the provider logical router.

In some embodiments, different logical routers may have different master network controllers that perform state computation for the logical routers. That is, a master network controller for a particular logical router takes the input configuration state for the logical router, and generates output state. The master network controller generates the flow entries and/or other data tuples used to implement the logical router, and distributes this data to the network elements in order for those network elements to implement the logical router. In some embodiments, the input configuration state for the logical routers is shared between network controllers in a network control system, and routes are propagated dynamically to a particular logical router only by the master network controller for the particular logical router.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
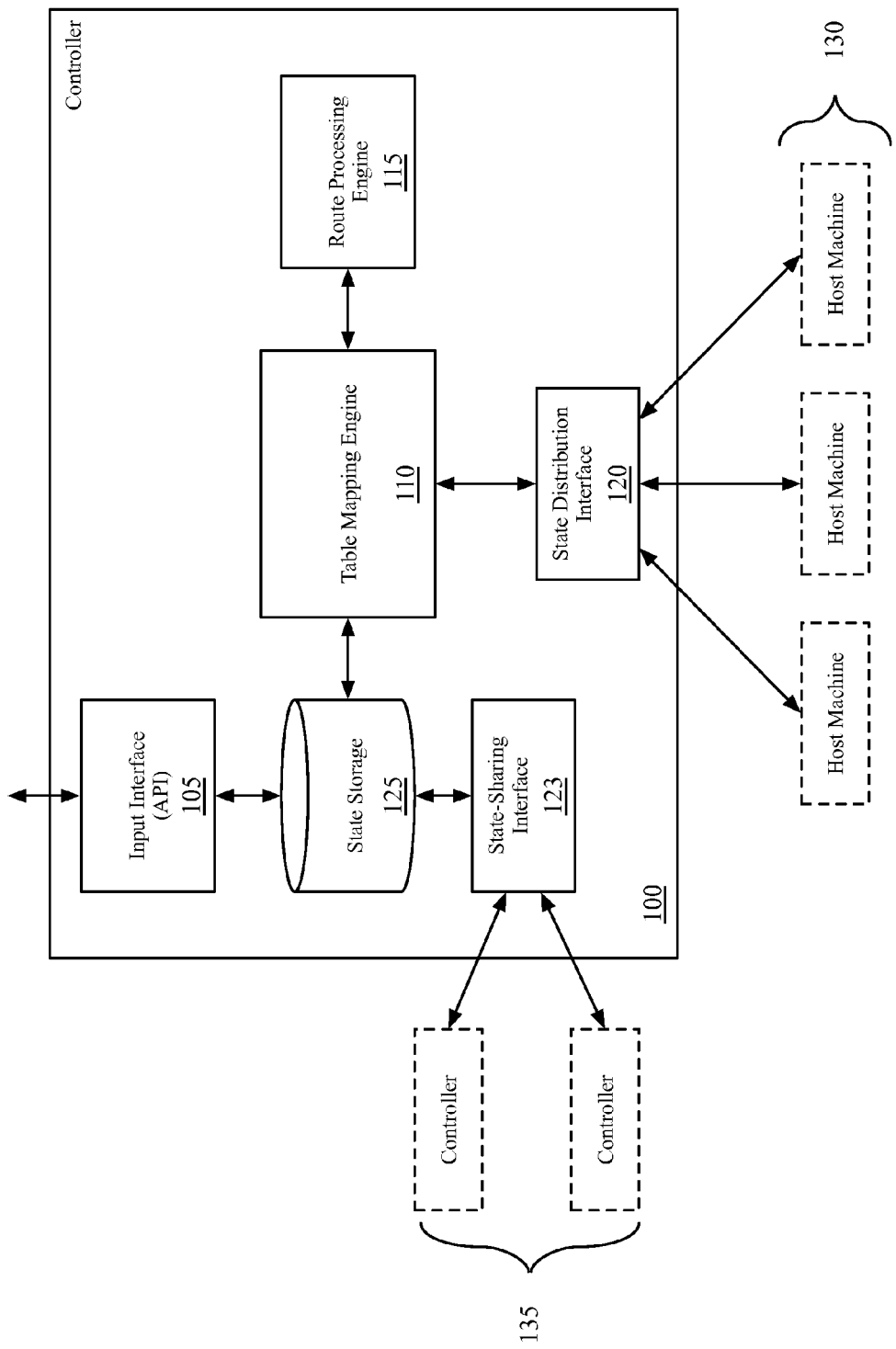
FIG. 1 conceptually illustrates the architecture of a network controller 100 of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that enables the connection of logical routers to each other, and the propagation of routes between the logical routers. In some embodiments, the logical routers are managed by one or more network controllers, which receive input to define the logical routers and compute additional route information for the logical routers. The computation of additional route information may include the propagation of routes specified for one logical router to a different logical router. In order for a logical router to be implemented in a physical network managed by a network controller of some embodiments, the network controller generates a routing table for the logical router and distributes the routing table to various elements in the network that implement the logical router. In some embodiments, the network controller distributes this routing table (including the dynamic route information) as (i) flow entries distributed to managed forwarding elements and (ii) data tuples defining a routing table for a virtualized container (e.g., a namespace) that operates as a L3 gateway for communicating with external networks.

In some embodiments, the network control system permits several different types of logical routers, which may have different predefined functionalities. Some embodiments arrange these different types of logical routers hierarchically. For example, in some embodiments, a first type of logical router connects to logical switches within a logical network while a second type of logical router provides connections between the shared virtualized infrastructure within which the logical routers are implemented and other networks external to the shared virtualized infrastructure.

Specifically, some embodiments enable tenant logical routers and provider logical routers for implementation within a virtualized network. The provider logical routers of some embodiments are managed by a datacenter provider to handle traffic in and out of a datacenter (e.g., a multi-tenant datacenter) within which various tenant logical networks are implemented. These provider logical routers, in some embodiments, may have connections to multiple tenant logical routers, as well as connections to external networks that are implemented in gateways (i.e., host machines that have a physical connection to routers in the external network). The tenant logical routers of some embodiments provide logical routing functionality to a single tenant logical network, allowing the tenant to connect multiple logical switches (to which the tenant machines (e.g., virtual machines) attach). The tenant logical routers, in some embodiments, may also connect to a provider logical router in order to receive traffic from, and send traffic to, external hosts. These restrictions on logical router functionality enable the datacenter administrator to manage, via the configuration of a provider logical router, the handling of traffic entering and exiting the datacenter.

FIG. 1 conceptually illustrates the architecture of such a network controller 100 of some embodiments. As shown, the network controller 100 includes an input interface (e.g., an API) 105, a table mapping engine 110, a route processing engine 115, a state distribution interface 120, and a state-sharing interface 123. In addition, the network controller 100 includes a state storage 125. The state storage 125, in some embodiments, stores information about one or more logical forwarding elements (e.g., logical switches, logical routers) of logical networks implemented within a virtualized physical network managed by the controller 100.

In some embodiments, the network controller 100 is one of several controllers that manages numerous managed forwarding elements that implement multiple logical networks across numerous host machines. For example, a logical network might include several logical switches that attach to a logical router, with numerous virtual machines (VMs) attached to the logical switches. The VMs reside on numerous host machines, possibly alongside VMs of other logical networks. A managed forwarding element (MFE) operates on each host machine (e.g., as a software forwarding element residing in the virtualization software of the host machine) in order to process packets sent to and received from the VMs on that host machine. In some embodiments, the MFE on a particular host machine stores information in order to implement the logical forwarding elements for the various different logical networks that have VMs residing on the host machine.

The network controller 100 may manage a particular one (or several) of these logical forwarding elements (or logical networks as a whole), and therefore stores information in the state storage 125 about the logical forwarding elements. In some embodiments, the network controller 100 receives configuration information defining the logical forwarding elements that it manages, and computes additional information for distribution to the MFEs at the host machines in order to implement the logical network. The state storage 125 stores both configuration state and computed state information for all of the logical forwarding elements managed by the controller 100. In addition, in some embodiments, other controllers share configuration state information with the network controller 100 for other logical networks that are not managed by the controller 100. However, in some such embodiments, the controllers do not share computed state information, and each controller only computes state for the logical networks that it manages.

The input interface 105 is an application programming interface (API) in some embodiments, through which the network controller 100 receives configuration information (e.g., configuration of logical ports of a logical router, static routes for a logical router, etc.). The configuration information may be input by an administrator logging into the network controller directly, or through a management application that translates administrator-entered information into API commands to send to the controller. Upon receiving this information, the input interface stores the configuration data into the state storage 125. In some embodiments, each logical forwarding element (e.g., the logical router) is stored as an object, and the routes are stored as objects which are owned by the logical router object. To define a configured route in the state storage 125, some embodiments store the type of route (e.g., connected, static, dynamic), the network address or range of addresses governed by the route, a destination (e.g., a next hop address, a logical port, a drop action) for packets having a network address in the range governed by the route, and a priority for the route.

The table mapping engine 110 performs state calculations for logical forwarding elements managed by the controller 100, in some embodiments. These state calculations may include generating flow entries to implement the logical forwarding elements, generating data tuples for logical services and routing tables for L3 gateways, etc. In some embodiments, the table mapping engine is implemented in a table mapping language that performs join operations between sets of tables, such as nLog or datalog. In addition, the table mapping engine of some embodiments generates dynamic routes based on connections with other logical routers, and the routes stored by the other logical routers (e.g., the static and connected routes). When the table mapping engine 110 of some embodiments receives a set of routes for a logical router that includes one or more dynamic or static routes (i.e., that includes routes other than those defined automatically based on the logical ports of the logical router), the table mapping engine utilizes the route processing engine 115 to translate the input set of routes into an output set of routes.

The route processing engine 115 of some embodiments receives a set of routes from the table mapping engine (e.g., routes automatically generated by the table mapping engine or network controller API based on the subnets to which the logical ports of the logical router connect, static routes input through the network controller API) and performs a recursive traversal process on the routes in order to identify a final logical destination for each network address range routed by the logical router. When multiple input routes provide contradictory information for a particular network address or range of addresses, the route processing engine 115 of some embodiments determines which route has a higher priority. The route processing engine of some embodiments is described in further detail in U.S. patent application Ser. No. 14/214,545, filed Mar. 14, 2014 and now published as U.S. Patent Publication 2015/0263952, which is incorporated herein by reference.

Upon receiving the output set of routes from the route processing engine, the table mapping engine 110 of some embodiments generates the information to distribute to the network elements (e.g., managed forwarding elements and managed gateways residing on the host machines 130) in order for the network elements to implement the logical router. This data may include flow entries sent to the managed forwarding elements (specifying, e.g., to forward packets with certain network addresses to certain logical ports) as well as routing table information for the gateways (e.g., data tuples defining a routing table for an IP stack operating in a namespace). In addition to flow entries that implement the logical routing table (specifying to forward packets to a particular logical port), the table mapping engine 110 of some embodiments also generates flow entries that map the logical port to physical interfaces so that packets can be sent across the physical managed network between managed forwarding elements.

The controller 100 distributes the data for the logical router (and other data for, e.g., other logical forwarding elements, such as logical switches that attach to the logical router) generated by the table mapping engine 110 to the host machines 130 via the state distribution interface 120. In some embodiments, the controller 100 distributes the data through a hierarchy of other network controllers. For instance, in some embodiments, each logical network (or each logical forwarding element) is managed by a particular controller (which may also manage other logical networks), and each host machine is managed by a particular controller (which may also manage other host machines). The controller 100 computes the state (e.g., flow entries) for logical networks that it manages, and distributes this data to the various controllers that manage the host machines implementing those logical networks. In other embodiments, the state distribution interface 120 interfaces directly with the host machines 130 to distribute the data.

The state-sharing interface 123 of some embodiments allows the controller 100 to share input configuration state information with other controllers 135 that manage the various managed forwarding elements of the network. In the hierarchical network control system mentioned above, the state-sharing interface 123 may be the same as the state distribution interface 120 (i.e., the controller-controller interface). In some embodiments, when the controller 100 receives input configuration state through the API 105 (or receives configuration changes sent upwards from the host machine), the controller 100 shares this input state information with the other controllers so that the other controller can compute output state for the logical forwarding elements that they manage. Some embodiments share the input configuration state, but do not share the output computed state.

An example operation of the network controller 100 will now be described. In some embodiments, a user inputs a configuration for a logical network, which may include several logical switches connected to a logical router. Each logical switch connects to a logical port of the logical router, and each logical port is assigned a subnet (i.e., a range of network addresses). In addition, at least one of the logical router ports connects to another logical router. The network controller 100 receives the configuration data (including the connection between logical routers) through the input interface 105.

Based on the received configuration data, the input interface 105 stores configuration state in the state storage 125. With respect to the logical router, the input interface stores (1) a connected route for each logical port, for routing packets with network addresses in the range specified for the logical port to that logical port, (2) any static routes specified separately in the configuration data, and (3) an indication of the connection with the other logical router. In some embodiments, the input interface 105 also automatically defines a low-priority default route for handling packets sent to network addresses for which routes are not otherwise defined (e.g., to a logical gateway port). In other embodiments, such a default route is only defined if input by a user.

Upon detecting the change in the configuration state stored in the state storage 125, the table mapping engine 110 begins generating new data tuples for distribution to the host machines in order to implement the logical network. In order to implement the connection between the logical routers, the table mapping engine 110 of some embodiments automatically generates dynamic routes for the input logical router based on input configuration data for the connected logical router. The connected logical router stores a set of routes (e.g., its own connected routes and static routes) which may have been input through the controller 100, or through one of the other controller 135 and shared with the controller 100.

The table mapping engine 110 propagates these routes to the input logical router, using the address of the connected logical router port as a next hop network address. For instance, if the connected logical router stores a connected route that routes network addresses in a particular subnet to a particular port of the logical router, the table mapping engine 110 automatically generates a new route for the input logical router that specifies the connected logical router (i.e., the address of a specific logical port of the connected logical router) as a next hop for network addresses in the particular subnet. Some embodiments also propagate manually entered static routes of one logical router to another logical router.

Similarly, connected routes for subnets attached to the input logical router, as well as static routes of the input logical router, are dynamically propagated to the connected logical router as dynamic routes that specify the input logical router as a next hop, either by the table mapping engine 110 or by the table mapping engine of a different network controller 135. In some embodiments, different logical routers may have different master network controllers that perform state computation for the logical routers. That is, a master network controller for a particular logical forwarding element takes the input configuration state for the logical forwarding element, and generates the output state (e.g., the flow entries and/or other data tuples used to implement the logical forwarding element). Thus, the dynamic propagation of routes from a first logical router to a second logical router might be performed by the controller 100, while the propagation of routes from the second logical router to the first logical router might be performed by one of the other controllers 135.

For the case of provider and tenant logical routers, some embodiments place restrictions on the routes that are dynamically propagated between logical routers. Specifically, when a tenant logical router connects to a provider logical router, some embodiments dynamically propagate the connected routes of the tenant logical router to the provider logical router, such that the provider logical router will send packets to the subnets specified by the connected routes to that tenant logical router. However, rather than dynamically propagating routes specifying information about the various other tenant networks that connect to the provider logical router, the network controller only propagates a dynamic default route to the tenant logical router that sends all packets not otherwise routed by more specific routes to the provider logical router.

In the example operation of controller 100, because dynamic routes (and/or static routes) are defined for the input logical router, the table mapping engine 110 offloads the route traversal to the route processing engine 115. Specifically, the table mapping engine 110 sends to the route processing engine 120 an input set of routes (i.e., those defined by the configuration state, including dynamic routes).

The route processing engine 115 generates an output set of routes from the received set of input routes. Specifically, the route processing engine identifies routes that are not in use (e.g., lower priority routes that are superseded by higher priority routes for the same set of network addresses), and recursively traverses the set of routes to identify a final action for each set of network addresses (e.g., a drop packet action, a final output port to which to send packets). The route processing engine 115 returns the final route information to the table mapping engine 110.

The table mapping engine 110 uses the final route information to generate flow entries and/or data tuples defining the implementation of the logical router for the host machines 130. The table mapping engine 110 provides these generated data tuples to the state distribution interface 120 for distribution to the host machines 130 (e.g., directly to the host machines, through a hierarchical network control system, etc.).

The above description introduces the network controller of some embodiments for managing logical routers with static routing. Several more detailed embodiments are described below. First, Section I introduces the implementation and configuration of logical networks via a network control system of some embodiments. Section II then describes the different classes of logical routers of some embodiments, and Section III describes the dynamic propagation of routes between logical routers in some embodiments. Finally, Section IV describes an electronic system with which some embodiments of the invention are implemented.

I. Provisioning of Logical Networks

In some embodiments, the network controllers (e.g., the controller described above by reference to FIG. 1) are part of a network control system used to manage numerous logical networks implemented in a physical managed network (e.g., a private datacenter such as an enterprise site, a public datacenter, etc.). In such a managed network, different tenants configure different logical networks, which the network control system implements in a virtualized fashion over the same physical network, while maintaining isolation between the logical networks. In addition, some such managed networks use a provider logical router to manage connections between the virtual machines in the logical network and external hosts (i.e., hosts that are not part of the tenant logical networks and are located outside the managed network). The tenants configure their logical network to connect to a provider logical router in order to send traffic to and receive traffic from such external hosts.

Figure 2:
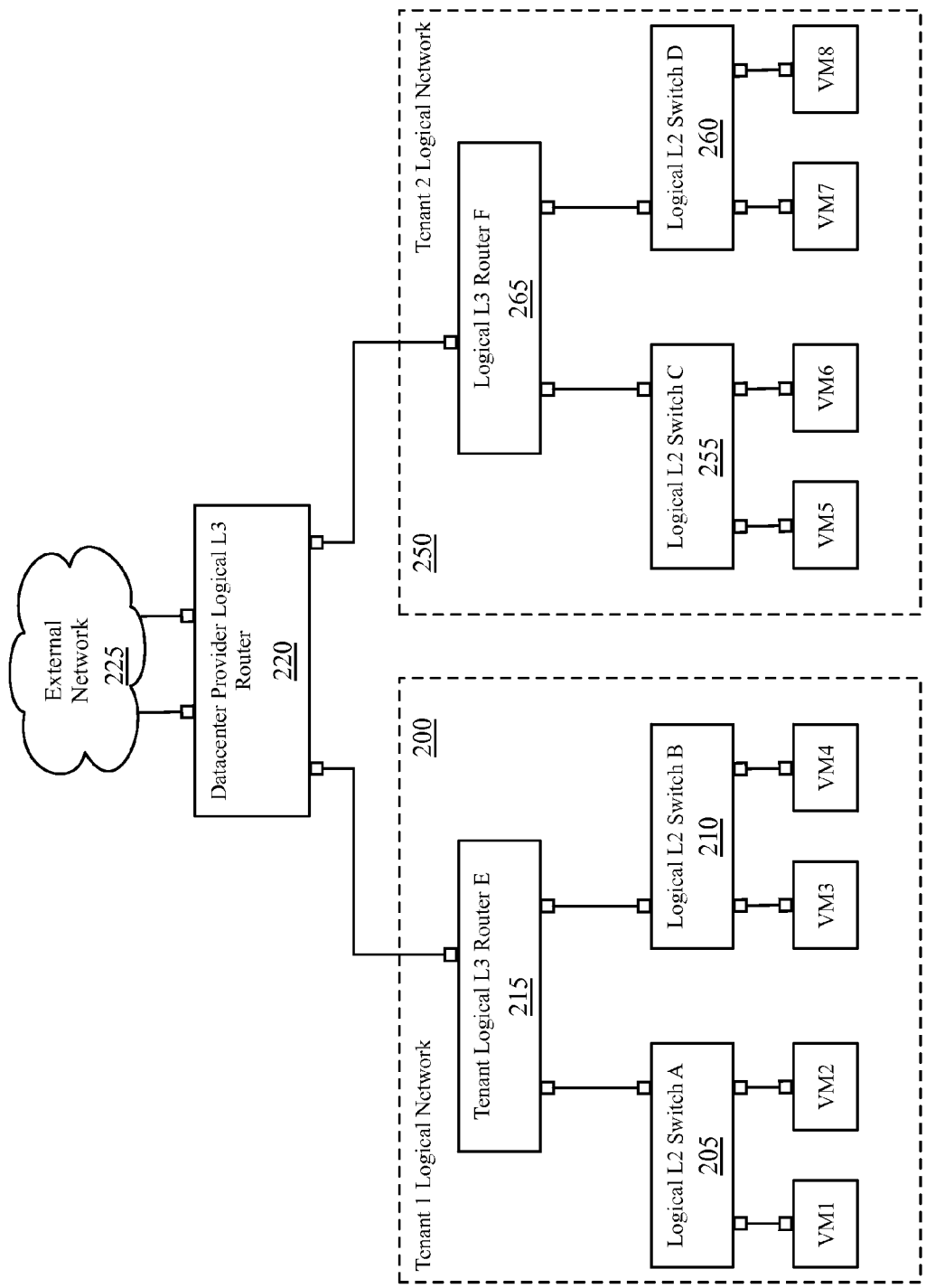
FIG. 2 conceptually illustrates an example set of logical network architectures for two different tenants.

FIG. 2 conceptually illustrates an example set of logical network architectures 200 and 250 for two different tenants. The first logical network 200 includes two logical switches 205 and 210 and a logical router 215. Each of the logical switches 205 and 210 connects several virtual machines (in this case, two virtual machines (VMs) are connected by each logical switch, though many networks will have far more VMs attached to each logical switch), and the logical router 215 connects the two logical switches (i.e., logical layer 2 domains) together. In addition, the logical router 215 connects the logical network 200 to a datacenter provider logical router 220. Similarly, the second logical network 250 also includes a logical router 265 that connects two logical switches 255 and 260. The logical router 265 connects to the datacenter provider logical router 220 as well.

The datacenter provider logical router 220, in addition to connecting to the logical routers 215 and 265, also includes two ports connecting to an external network 225 (or to separate external networks). In various examples, the datacenter provider logical router may have only one port, or numerous ports connecting to external networks.

In some embodiments, each logical network is an abstract conception of a network generated by an administrator (e.g., by each of the tenants), and the logical network is implemented in a virtualized, distributed manner in a managed physical infrastructure (e.g., in a multi-tenant datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.). Thus, the same host machine may host VMs from both of the logical networks 200 and 250, and the MFEs on these host machines would implement the logical forwarding elements 205-215 as well as the logical forwarding elements 255-265.

A tenant logical router, in some embodiments, connects a set of logical switches to which virtual machines logically attach. Each logical switch (or each logical port of the logical router to which a logical switch attaches) represents a particular set of IP addresses (i.e., a subnet), and is implemented in the managed network across a set of managed forwarding elements (MFEs) to which the virtual machines physically connect (e.g., through virtual interfaces). In some embodiments, some logical routers are implemented in a centralized manner (e.g., in one or more redundant gateways), rather than distributed across the MFEs with the logical switches. In other embodiments, the logical routers are implemented in a distributed fashion as well by the MFEs that connect to the virtual machines. Some embodiments specifically require that both tenant and provider logical routers be implemented in a distributed manner.

For a provider logical router, which also connects to the external network via one or more ports, the connections to the external network are implemented through the use of one or more gateways. The gateways, in some embodiments, are responsible for both sending data traffic from the managed network to the external unmanaged physical network and processing traffic sent from the external network into the managed network.

Figure 3:
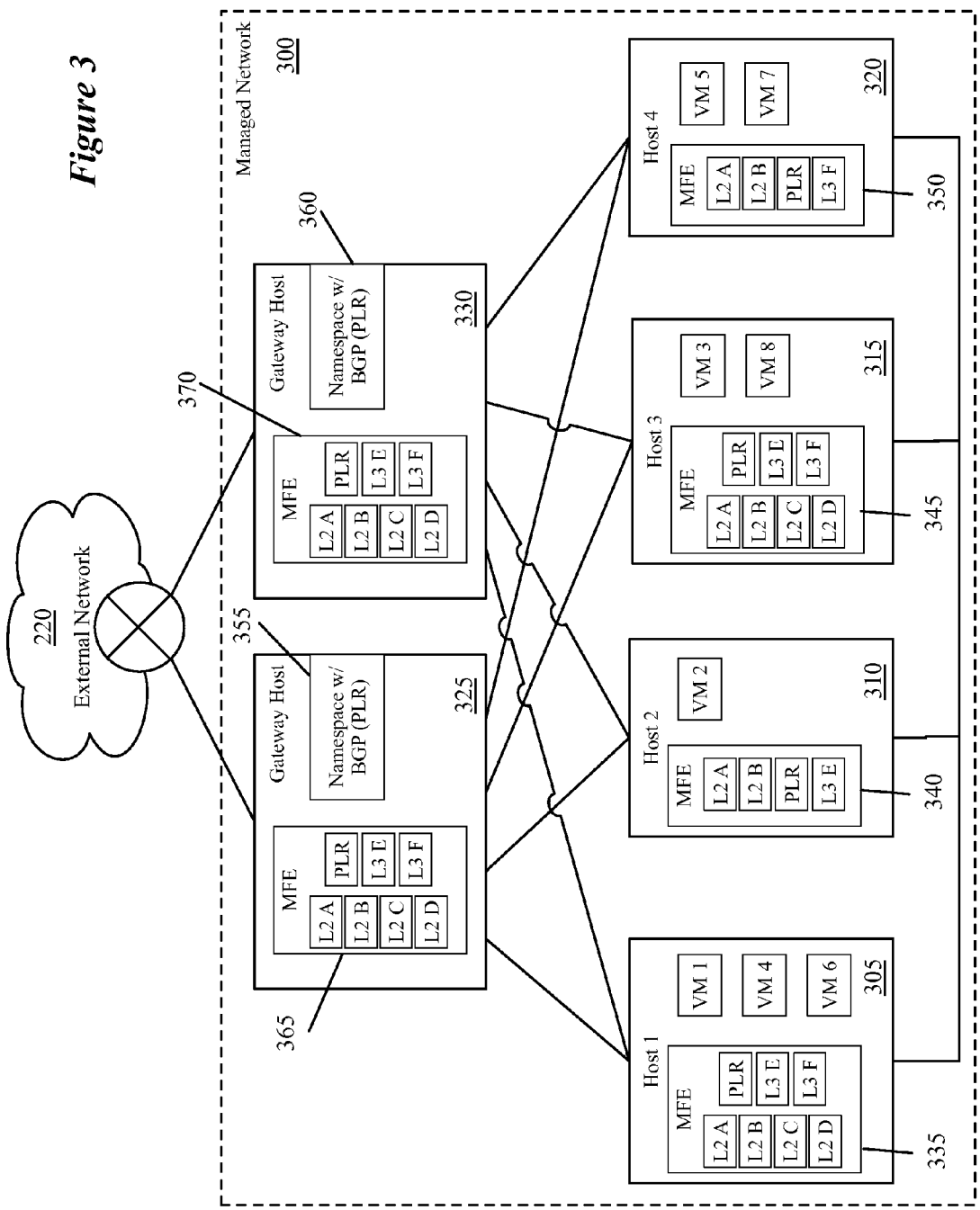
FIG. 3 conceptually illustrates the implementation of the logical networks of FIG. 2 in a managed network of some embodiments.

FIG. 3 conceptually illustrates the implementation of the logical networks 200 and 250 in a managed network 300 of some embodiments. As shown, the physical infrastructure of the managed network 300 includes four host machines 305-320 for hosting virtual machines, and two gateway host machines 325-330 for hosting L3 gateways. The VMs of the logical networks 200 and 250 reside on the hosts 305-320, implemented on top of virtualization software (e.g., a hypervisor, virtual machine monitor, etc.) that operates in the host. Additional virtual machines that connect to other logical networks may also reside on some or all of these hosts 305-320 in the physical infrastructure of the managed network, as well as on other hosts not shown in this figure.

In addition to the virtual machines, each of the hosts 305-320 operates a managed forwarding element (MFE) 335-350. In some embodiments, this MFE is a software virtual switch that operates within the virtualization software of the host (e.g., Open vSwitch, or another software forwarding element). Because the logical routers 215, 220, and 265 are distributed, the MFEs 335-350 implement both the logical switches 205, 210, 255, and 260 as well as the logical routers 215, 220, and 265.

As shown, because VMs from both the logical networks 200 and 250 reside on the first host 305, the MFE 335 implements (i) the logical switches to which these VMs connect, (ii) other logical switches of these two logical networks, (iii) the logical routers of these two logical networks, and (iv) the provider logical router. On the other hand, the second host 310 only hosts a VM from the first logical network 200, and therefore the MFE 340 implements the logical forwarding elements 205-215 of this logical network as well as the provider logical router 220. Implementing all of these logical forwarding elements in the MFE at the host enables first-hop processing in some embodiments, in which most or all of the logical forwarding element processing for a packet is performed at the first MFE that receives the packet. Thus, a packet sent from VM 1 to VM 3 would be processed, at the MFE 335, through the logical switch 205 to logical router 215 to logical switch 210. The MFE 335 would identify the logical egress port of logical switch 210 for the packet as the port to which VM 3 attaches, and map this egress port to a tunnel to the MFE 345 at host 315. For a packet sent from VM 1 in logical network 200 to VM 7 in logical network 250 (which the sender may not realize is in a logical network hosted on the same virtualized infrastructure), the MFE 335 would process the packet through the logical switch 205 to the logical router 215 to the provider logical router 220, then into the logical network 250 through the logical router 265 and then the logical switch 260, at which point the packet would be sent through a tunnel to the MFE 350.

For traffic sent to an external destination (i.e., not in either of the logical networks 200 or 250), the MFE identifies a logical egress port of the logical router as one of the ports that connects to the external network 220. The MFE then sends this traffic to one of the gateway hosts 325 or 330, depending on which port the external destination maps to (i.e., depending on the routing table of the provider logical router 220). In some embodiments, each of the gateway host machines 325 and 330 host a virtualized container (e.g., a namespace) 355 and 360 that has the ability to store a routing table (and, e.g., the rest of a network stack). These virtualized containers each correspond to a particular port of the provider logical router that connects to the external network, handle traffic sent out of the managed network via that port or entering the network via that port.

In addition, each of the virtualized containers 355 and 360 operates a route advertisement application (e.g., a BGP daemon). The route advertisement application of some embodiments uses a dynamic routing protocol to advertise routes to external routers (i.e., for the subnets of the logical ports of the tenant logical routers connected to the provider logical router) in order to attract traffic for the network addresses specified by those routes. The route advertisement application of some embodiments is described in greater detail in the U.S. patent application Ser. No. 14/214,561, filed Mar. 14, 2014 and now published as U.S. Patent Publication 2015/0263946, which is incorporated herein by reference.

The gateway host machines 325 and 330, in some embodiments, also operate MFEs 365 and 370. These MFEs perform first-hop processing for packets received at the gateways from the external network 220. For example, when a packet is received from a physical router, the MFE first sends the packet to the appropriate namespace (as multiple logical routers may have gateways operating on the gateway host machine) based on a destination MAC address of the packet, which performs its ingress processing and sends the packet back to the MFE. At this point, the packet enters the logical network, and the MFE performs logical network processing (through the provider logical router, the appropriate tenant logical router, and the appropriate logical switch in order to identify a destination logical egress port), then tunnels the packet to the appropriate MFE for delivery to the destination VM.

As described above, these MFEs and gateways are provisioned, in some embodiments, by a network control system. One or more network controllers in the network control system receive the network configuration input by a user/administrator and convert this information into flow entries and/or data tuples that can be used by the MFEs and gateway host machines, and distributes the data tuples to the host machines.

Figure 4:
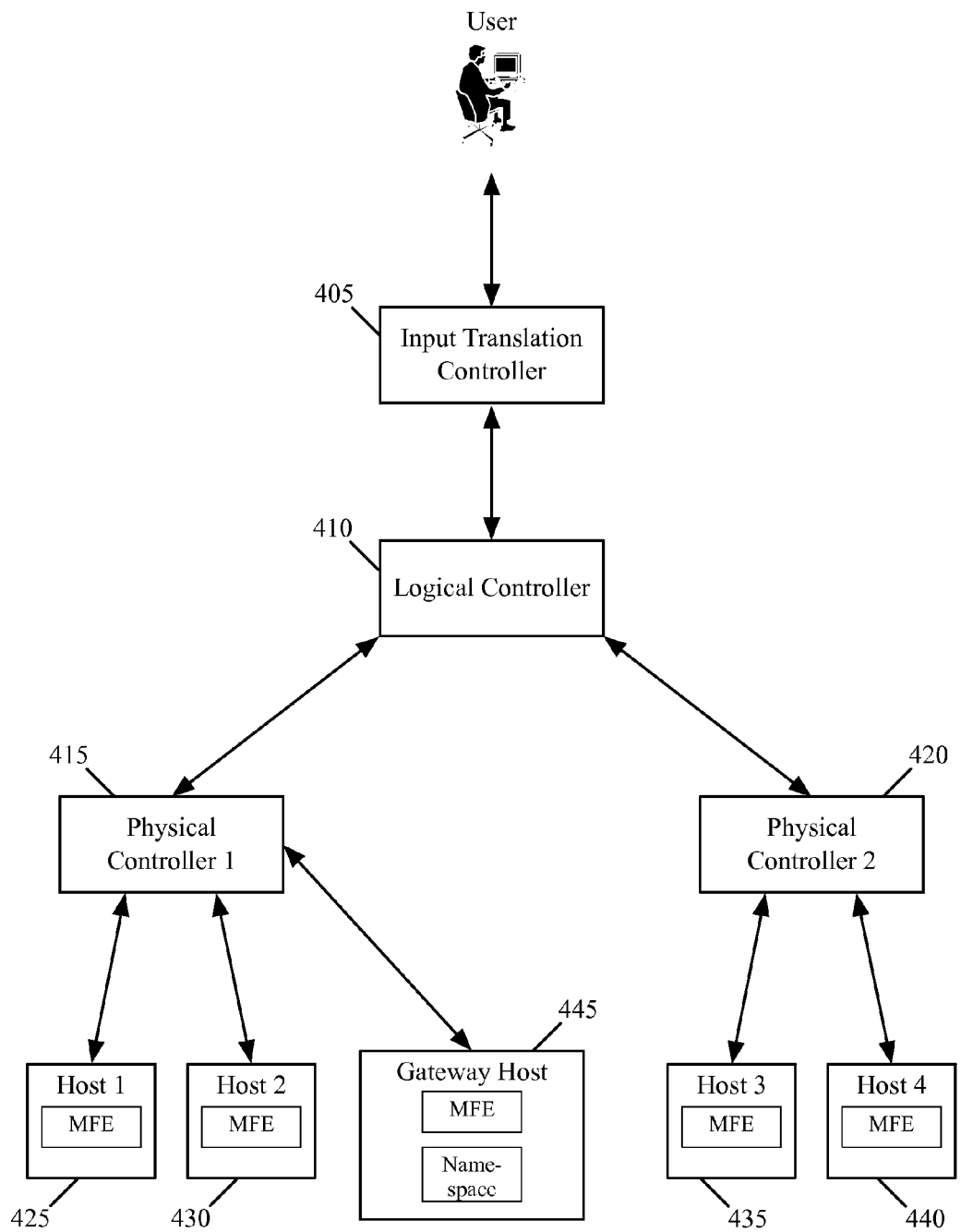
FIG. 4 conceptually illustrates a network control system of some embodiments for provisioning managed forwarding elements and L3 gateways in order to implement logical networks.

FIG. 4 conceptually illustrates such a network control system 400 of some embodiments for provisioning managed forwarding elements and L3 gateways in order to implement logical networks. As shown, the network control system 400 includes an input translation controller 405, a logical controller 410, physical controllers 415 and 420, host machines 425-440, and a gateway host machine 445. As shown, the hosts 425-440, as well as the gateway host 445, include managed forwarding elements, which may implement logical forwarding elements as shown in the above figure. The gateway host 445 also includes a namespace, which implements at least a portion of a routing table for a logical router of the managed network. One of ordinary skill in the art will recognize that many other different combinations of the various controllers and hosts are possible for the network control system 400.

In some embodiments, each of the controllers in a network control system is a computer (e.g., with an x86-based processor) with the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 405 and the logical controller 410 may run in the same computing device, with which a data center management application interacts (or with which an administrator interacts directly).

The input translation controller 405 of some embodiments includes an input translation application that translates network configuration information received from a user. While shown as receiving the information directly from the user in FIG. 4, in some embodiments a user interacts with a data center management application, which in turn passes the network configuration information to the input translation controller.

For example, a user may specify a network topology such as the logical network 200 or 250 shown in FIG. 2. For each of the logical switches, the user specifies the machines that connect to the logical switch (i.e., to which logical ports of the logical switch the VMs are assigned). The user may also specify which logical switches attach to any logical routers, one or more logical ports of the logical router for connection to external networks or to other logical routers (e.g., to a provider logical router), and any configuration details for the logical router. For instance, some embodiments enable the user to specify policies for the logical router. The input translation controller 405 translates the received network topology into logical control plane data that describes the network topology as a set of data tuples in some embodiments. For example, an entry might state that a particular MAC address A is located at a first logical port X of a particular logical switch, that a tenant logical router Q is located at a second logical port Y of the particular logical switch, or that a logical port G of the tenant logical router Q connects to a provider logical router.

In some embodiments, each logical forwarding element (e.g., each logical router, logical switch, etc.) is governed by a particular logical controller (e.g., logical controller 410). The logical controller 410 of some embodiments translates the logical control plane data that defines the logical network and the logical forwarding elements (e.g., logical routers, logical switches) that make up the logical network into logical forwarding plane data, and the logical forwarding plane data into physical control plane data. The logical forwarding plane data, in some embodiments, consists of flow entries described at a logical level. For the MAC address A at logical port X, logical forwarding plane data might include a flow entry specifying that if the destination of a packet matches MAC A, to forward the packet to port X. The port of the logical router Q will also have a MAC address, and similar flow entries are created for forwarding packets with this MAC address to port Y of the logical switch. Similarly, for a logical router with a port K associated with a range of IP addresses C1-C24, the logical forwarding plane data might include a flow entry specifying that if the destination of a packet matches IP C1-C24, to forward the packet to port K.

In some embodiments, the logical controller translates the logical forwarding plane data into universal physical control plane data. The universal physical control plane data enables the network control system of some embodiments to scale even when the network includes a large number of managed forwarding elements (e.g., hundreds, thousands) to implement a logical forwarding element, and when the network implements a large number of logical networks. The universal physical control plane abstracts common characteristics of different MFEs in order to express physical control plane data without considering differences in the MFEs and/or location specifics of the MFEs.

As stated, the logical controller 410 of some embodiments translates logical control plane data into logical forwarding plane data (e.g., logical flow entries that include a match over logical network parameters, such as logical addresses, logical ingress ports, etc.), then translates the logical forwarding plane data into universal physical control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine (e.g., an nLog engine) to translate between the planes (e.g., by applying join operations on the tables). The input and output tables, in some embodiments, store sets of data tuples that define the different planes of data.

In some embodiments, the logical router processing entails recursive route traversal processes and various types of error checking that are not optimally performed by the table mapping engine. Specifically, the configuration data for a logical router includes a set of input routes (analogous to the routing information base of a physical router) that must be narrowed to a set of output routes used to implement the routing table of the logical router (analogous to the forwarding information base of a physical router). In some embodiments, this set of output routes is part of the logical control plane data. In order to generate this logical control plane data for the logical router, the table mapping engine of some embodiments offloads the route processing to a separate module in the logical controller, implemented in a language better suited to such recursive and error checking/generation actions. The route processing engine returns a set of output routes that the table mapping engine incorporates into its generation of logical forwarding plane entries.

Each of the physical controllers 415 and 420 is a master of one or more managed forwarding elements (e.g., located within host machines). In this example, each of the two physical controllers is a master of two managed forwarding elements located at the VM host machines 425-440. Furthermore, the physical controller 415 is a master of two gateway hosts 445 and 450, which host MFEs as well as the active and standby logical routers for a particular logical network. In some embodiments, the active and standby hosts for a logical router are managed by the same physical controller (as in this figure), while in other embodiments separate physical controllers manage the different gateway hosts of a logical network.

In some embodiments, a physical controller receives the universal physical control plane data for a logical network and translates this data into customized physical control plane data for the particular MFEs that the physical controller manages and which require data for the particular logical network. In other embodiments, the physical controller passes the appropriate universal physical control plane data to the MFEs, which have the ability (e.g., in the form of a chassis controller running on the host machine) to perform this conversion themselves.

The universal physical control plane to customized physical control plane translation involves a customization of various data in the flow entries. For the first example noted above, the universal physical control plane would involve several flow entries (i.e., several data tuples). The first entry states that if a packet matches the particular logical data path set (e.g., based on the packet being received at a particular physical ingress port), and the destination address matches MAC A, then forward the packet to logical port X. This entry will be the same in the universal and customized physical control planes, in some embodiments. Additional entries are generated to match a physical ingress port (e.g., a virtual interface of the host machine) to the logical ingress port X (for packets received from the VM having MAC A), as well as to match a destination logical port X to the physical egress port of the physical MFE (e.g., again the virtual interface of the host machine). However, these physical ingress and egress ports are specific to the host machine on which the MFE operates. As such, the universal physical control plane entries include abstract physical ports while the customized physical control plane entries include the actual physical interfaces (which, in many cases are virtual interfaces) of the specific MFEs.

In some embodiments, as shown, the gateway hosts also operate managed forwarding elements (e.g., using the same packet processing/virtual switching software as the VM hosts 425). These MFEs also receive physical control plane data from the physical controller that enables the MFEs to implement the logical forwarding elements. In addition, some embodiments distribute the routing table data to the namespaces operating in the gateway hosts through the hierarchical network control system. The logical controller 410 that manages the logical network selects the gateway host for the logical router in some embodiments (e.g., using a load balancing algorithm that spreads the logical routers for various logical networks across a set of hosts).

The logical controller 410 identifies the physical controller 415 that manages the selected gateway host, and distributes the routing table (as well as any other information used for layer 3 processing, such as firewall information, NAT, etc.) to the identified physical controller. In some embodiments, the routing table is distributed as a set of data tuples. The physical controller 415 then distribute these data tuples to the gateway host 445. The gateway hosts convert these data tuples into a routing table for use by a container (e.g., a VM, a namespace) that operates on the gateway host as a logical router or L3 gateway.

The above describes the hierarchical network control system of some embodiments, although the network control system of other embodiments includes only a single controller (or a controller cluster with one active and one or more standby controllers). Some other embodiments include a cluster of network controllers that operate with each logical forwarding element or logical network assigned to a master controller and each managed forwarding elements assigned to a master controller, but without the hierarchical arrangement shown in FIG. 4.

Figure 5:
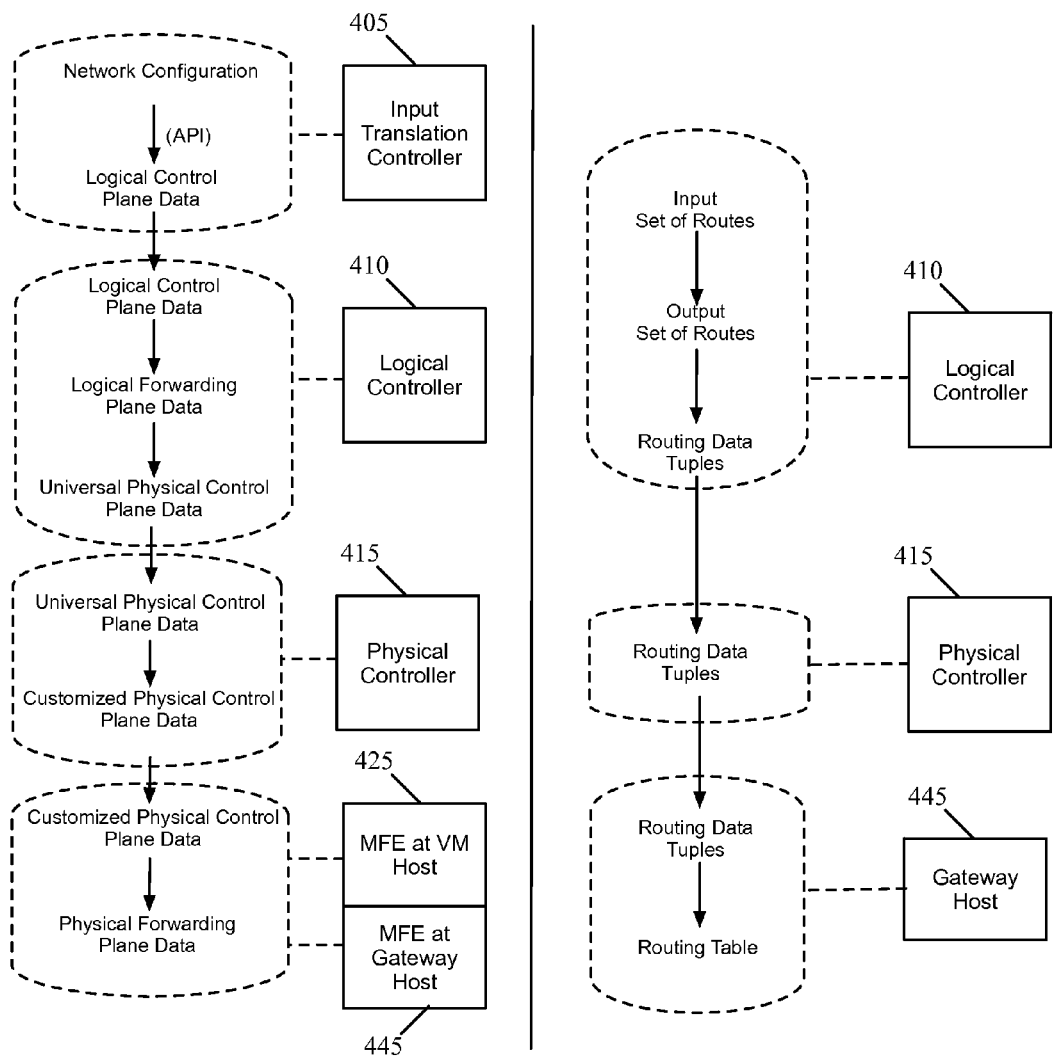
FIG. 5 conceptually illustrates the propagation of data through the hierarchical network control system of some embodiments.

FIG. 5 conceptually illustrates the propagation of data through the hierarchical network control system of some embodiments. The left side of this figure shows the data flow to the managed forwarding elements to implement the logical forwarding elements (e.g., logical switches, tenant logical routers, and provider logical routers) of the logical network, while the right side of the figure shows the propagation of routing table data to the gateway hosts in order to provision the virtualized containers (e.g., namespaces) operating as L3 gateways on the gateway hosts (e.g., for the provider logical routers).

On the left side, the input translation controller 405 receives a network configuration through an API, which is converted into logical control plane data. This network configuration data includes a logical topology such as that shown for logical network 200 in FIG. 2. In some embodiments, the network configuration may also include the specification of one or more static routes for a logical router, and the connection of one logical router to another (e.g., the tenant logical router to provider logical router connection). The network configuration specifies the various ports of the logical forwarding elements. In some embodiments, each logical switch port is assigned a MAC address and an IP address, and each logical router port is assigned a MAC address and an IP address, and is associated with a particular subnet (to which the IP address belongs). Some embodiments require that two logical router ports that connect to each other must be associated with the same subnet, of at least a threshold specificity.

As shown, the logical control plane data is converted by the logical controller 410 (specifically, by a control application of the logical controller) to logical forwarding plane data, and then subsequently (by a virtualization application of the logical controller) to universal physical control plane data. In some embodiments, these conversions generate a flow entry at the logical forwarding plane (or a data tuple that defines a flow entry), then add a match over the logical data path set (e.g., the logical switch or router) at the universal physical control plane. The universal physical control plane also includes additional flow entries (or data tuples) for mapping generic physical ingress ports (i.e., a generic abstraction of a port not specific to any particular MFE) to logical ingress ports as well as for mapping logical egress ports to generic physical egress ports. For instance, for forwarding a packet to a logical router, the flow entries at the universal physical control plane for a logical switch would include a forwarding decision to send a packet to the logical port to which the logical router connects when the destination MAC address matches that of the logical router port.

Similar to the examples in the previous paragraph for the logical switch, the logical router flow entries identify a logical egress port based on a match over (i) the logical router pipeline (i.e., that the packet has been forwarded to the logical router) and (ii) the IP address. The mapping of IP address to logical port, in some embodiments, is based on the routing table generated at the logical controller for the logical router. For packets forwarded to a logical router port that faces an external network (e.g., a port of a provider logical router), the universal physical control plane additionally includes entries for mapping the logical egress port to a destination gateway and encapsulating the packet in a tunnel to the gateway host.

The physical controller 415 (one of the several physical controllers in the hierarchical network control system 400), as shown, translates the universal physical control plane data into customized physical control plane data for the particular MFEs that it manages at hosts 425, 430, 445, and 450. This conversion involves substituting specific data (e.g., specific physical ports) for the generic abstractions in the universal physical control plane data. For instance, in the example of the above paragraph, the port integration entries are configured to specify the physical layer port appropriate for the particular L3 gateway connection (e.g., an actual physical port and tunnel encapsulation information for the particular host machine on which the MFE operates).

The MFE at host 425 (one of several MFEs managed by the physical controller 415) performs a translation of the customized physical control plane data into physical forwarding plane data, in some embodiments. The physical forwarding plane data, in some embodiments, are the flow entries stored within a MFE (e.g., within a software virtual switch such as Open vSwitch) against which the MFE actually matches received packets. In addition, the MFE at the gateway host 445 performs such a translation in order to forward packets between the namespace and the other network entities (e.g., VMs).

The right side of FIG. 5 illustrates data propagated to the gateway hosts (e.g., host 445) to implement a logical router (either a centralized logical router or a L3 gateway for a distributed logical router), rather than to the MFEs. As shown, the logical controller 410 receives an input set of routes, generates an output set of routes, and then translates the output set of routes into routing data tuples from these routes.

In some embodiments, the input set of routes is generated by either the logical controller or the input translation controller from the network configuration input by the user (e.g., the administrator). When a user designs the logical network (such as network 200), each logical switch has an associated IP subnet. From this, the logical controller automatically generates routes to each of these logical router ports that attach to the logical switches (e.g., if IP=10.0.0.0/24, send to Port J). In addition, when a tenant logical router connects to a provider logical router, the logical controller of some embodiments generates a low priority default route to send packets to the provider logical router when the packets do not match any other routes. For a provider logical router, the logical controller of some embodiments generates a low priority default route to send packets to one of the ports connecting to the external network when the packets do not match any other routes. The logical controller may have data in some embodiments that identifies a physical router in the external network, so that the default route sends packets to the identified router.

In addition, in some embodiments, the logical controller that manages a first logical router generates dynamic routes for the first logical router when the first logical router connects to a second logical router. In some embodiments, for each connected route of the second logical router, the master controller for the first logical router generates a dynamic route specifying for the first logical router to logically forward packets with a destination address matching the prefix of the connected route to the second logical router. Some embodiments also propagate connected routes similarly. In the specific case of a tenant logical router (TLR) connecting to a provider logical router (PLR), some embodiments dynamically propagate to the PLR the connected routes of the TLR for each port to which a logical switch attaches. However, in order to maintain isolation between the multiple logical networks that may attach to a PLR, the PLR routes are not propagated to the TLR. Instead, only a dynamic default route is propagated to the TLR, which sends all otherwise unrouted packets to the PLR.

Before calculating the flow entries or the routing data tuples for the logical router, the logical controller of some embodiments generates an output set of routes based on the input set of routes. In some embodiments, a route processor in the logical controller recursively traverses the set of input routes to identify final output actions for each set of network addresses.

For a distributed logical router, much of the output set of routes is specified as part of the logical control plane data and converted into physical control plane data (as shown on the left side of FIG. 5). In this case, the routing data tuples for distribution to the L3 gateways will still include the routes to the external physical router(s), as well as routes for processing incoming packets received via the connection with these external routers.

In addition to the routes themselves, the logical controller 410 also generates a set of data tuples that defines the logical routers. For instance, when a logical router is created, the logical controller of some embodiments selects at least one gateway host, then creates a new data tuple (i.e., a record) that specifies the new namespace (or other container) on the host for the logical router. In addition, some embodiments specify in the data tuple that routing is enabled for the namespace (as opposed to, or in addition to, other services such as DHCP).

Once the logical controller 410 creates the data tuples and identifies the gateway host (or hosts) that will receive the data tuples, the logical controller then identifies the physical controller that manages the gateway host. As mentioned, like the VM hosts 425-440, each of the gateway hosts has an assigned master physical controller. In the example of FIG. 4, the gateway host is managed by the physical controller 415, so the other physical controller 420 does not receive the logical router data tuples. In order to supply the logical router configuration data to the gateway hosts, the logical controller 410 of some embodiments pushes the data to the physical controller 415. In other embodiments, the physical controllers request the configuration data (e.g., in response to a signal that the configuration data is available) from the logical controller.

The physical controller 415 passes the data to the gateway host 445, much as it passes the physical control plane data. In some embodiments, the routing data tuples are sent to a database running on the host that is part of the software associated with the MFE, and used to configure certain aspects of the MFE (e.g., its port information and other non-flow entry configuration data). Some embodiments use a first protocol (e.g., OpenFlow) to pass the flow entries for the MFE to the hosts, while using a second protocol (e.g., OVSDB) to pass the configuration and routing table data to the hosts. The namespace or other container implementing the logical router retrieves the appropriate information from the database on its host, or has the appropriate information passed to it. In some embodiments, a process on the gateway host 445 translates the data tuples stored in the database into a routing table and other network stack data (e.g., a standard Linux network stack, including a routing table) for the namespace.

The above description describes the conversion, by the network control system, of the network configuration into a set of physical forwarding plane flow entries that the physical controller passes to the host (e.g., via a protocol such as OpenFlow). In other embodiments, however, the data for defining flow entries is passed in other forms, such as more abstract data tuples, and the MFEs or processes running on the hosts with the MFEs convert these data tuples into flow entries for use in processing data traffic.

II. Connection of Different Types of Logical Routers

As indicated above, the network control system (e.g., the network controllers) of some embodiments enables the connection of different types of logical routers. These different types of logical routers may be defined in the network control system of some embodiments as different classes of objects, or as the same type of objects with different values for a router type parameter. In some embodiments, the different types of logical routers are arranged hierarchically. For instance, some embodiments include a first type of logical router to which logical switches may attach, and a second type of logical router that may connect to external physical networks. In addition, some embodiments may include one or more additional types of logical routers (e.g., for placement between these first two logical router types.

In some embodiments, the network control system provides the option of tenant logical routers and provider logical routers. TLRs are those that are part of a tenant logical network, and to which the tenant that "owns" the logical network may attach logical switches (via the network control system interface). In some embodiments, TLRs may not have gateway ports; that is, they may not directly attach to external networks. PLRs are those that enable the tenant logical networks to reach the external networks. That is, the PLRs accept TLR connections and may have one or more gateway ports attaching to external networks. Packets sent from a tenant VM will be first processed by a TLR pipeline (after logical switch processing), then sent to the PLR logical pipeline for processing if destined for an external network address. The PLR logical pipeline identifies a gateway port as the egress port for the packet, and sends the packet to the gateway host machine associated with that gateway port.

When a TLR is connected to a PLR, some embodiments automatically propagate dynamic routes to the PLR such that the PLR routes packets to the TLR for the various subnets served by the TLR, and automatically propagate a dynamic default route to the TLR that causes the TLR to send packets to the PLR when not otherwise routed by a more specific or higher priority route. When this information is generated, the network control system of some embodiments generates, from the connected, dynamic, and static routes, flow entries and data tuples used to implement the logical router by the network elements managed by the network control system.

Figure 6:
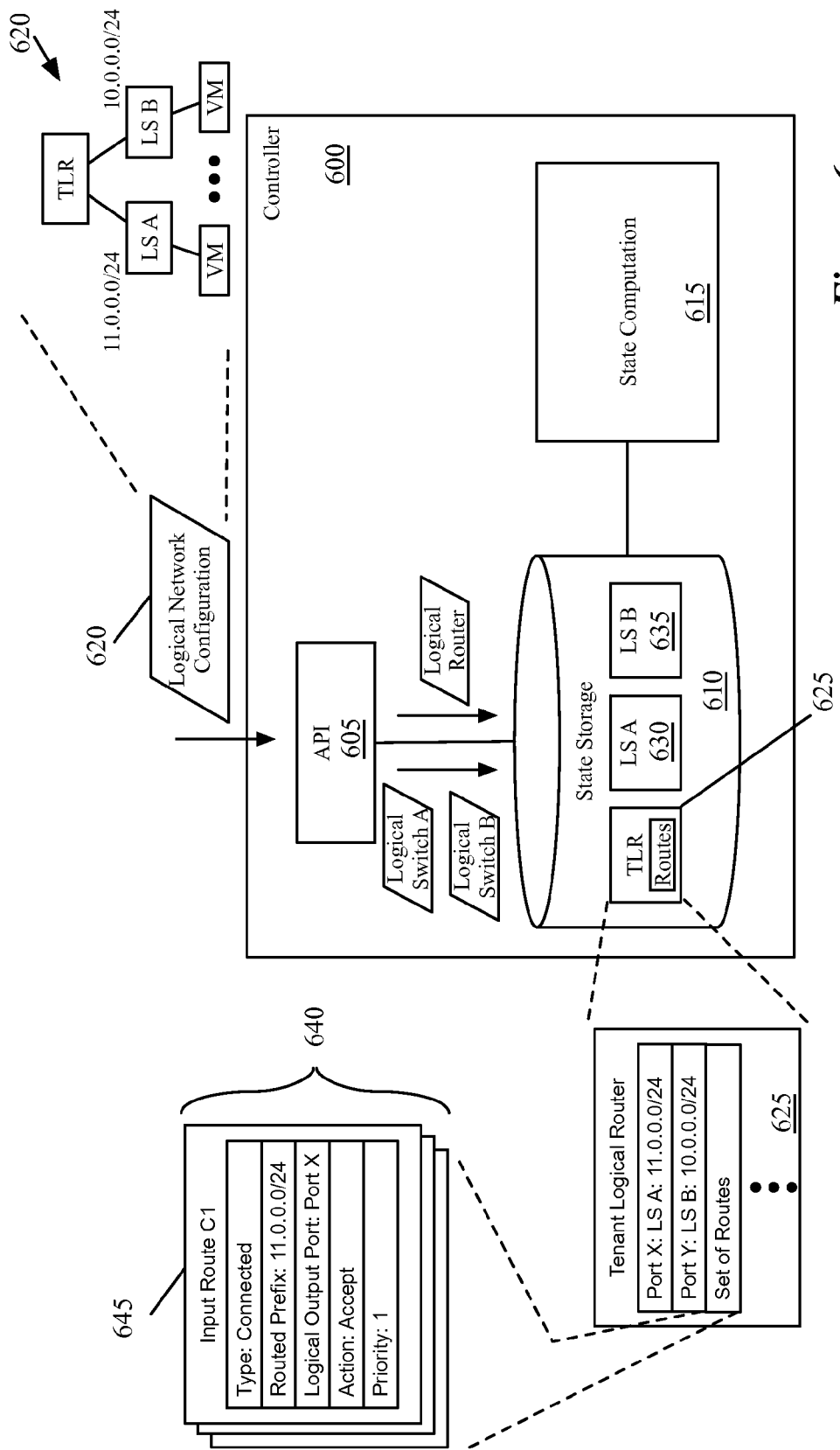
FIG. 6 conceptually illustrates the receipt of a logical network configuration by a controller of some embodiments.
Figure 7:
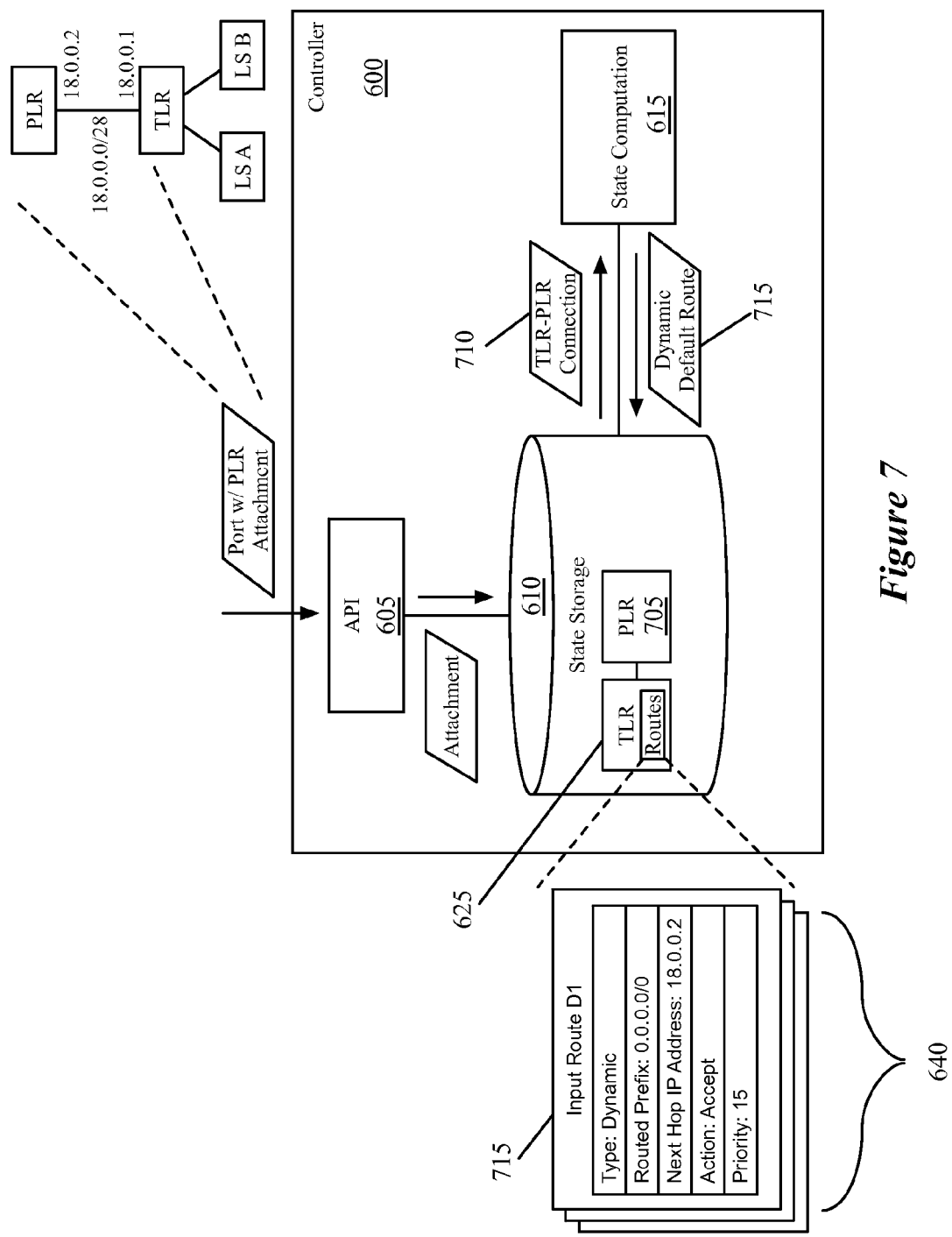
FIG. 7 conceptually illustrates the receipt by the controller of input configuration data to attach a TLR, created as shown in FIG. 6, to a PLR.
Figure 8:
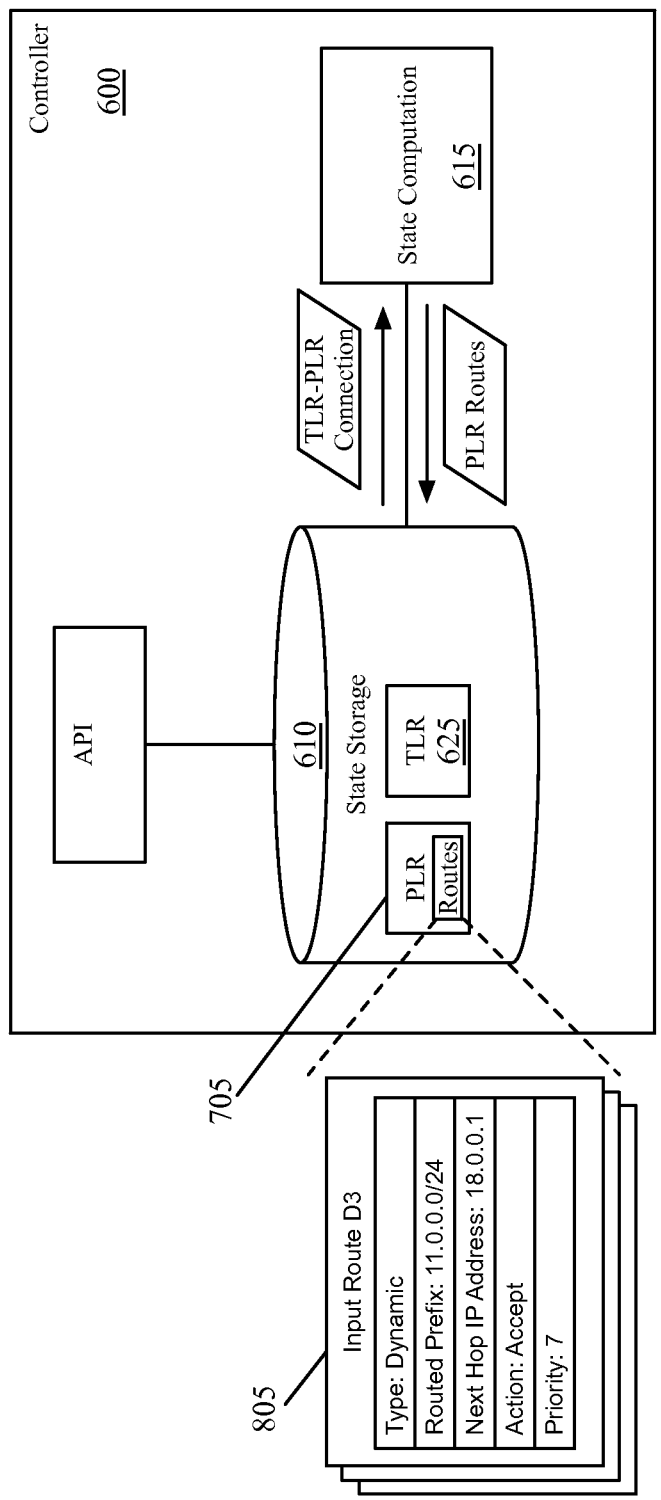
FIG. 8 conceptually illustrates the result of the TLR-PLR connection as it pertains to the PLR data.

FIGS. 6-8 conceptually illustrate the input of a logical network configuration and TLR-PLR connection for a logical network at a network controller 600, and the routes generated as a result. The controller 600, as shown, includes an API 605 for receiving configuration data, a state storage 610, and a state computation module 615.

The API 605 of some embodiments provides an interface through which the controller receives configuration state data for one or more logical networks. In some embodiments, the API 605 represents a set of methods that may be used to create, modify, delete, query, etc. logical network data in the state storage 610. In some embodiments, a network administrator may access the controller through a direct connection (e.g., by manually inputting the API calls) or through a cloud management application. In the case of a cloud management application, in some embodiments the administrator configures a logical network through a graphical interface (or other intuitive interface) of the application, which translates the data received from the user into the appropriate API calls to the controller 600.

Some such API methods for the API 605 include methods to create a logical router, create logical router ports, create a logical switch, attach a logical switch to a logical router (e.g., to a TLR), connect a TLR port to a PLR port, attach a logical port of a logical router (e.g., a PLR) to an external network, create a static route, modify a static route, remove a static route, query a logical router for its routes, etc. These various methods, in some embodiments, enable the administrator to access or modify configuration state data stored in the state storage 610. While the API 605 enables an administrator to query dynamic routes, in some embodiments dynamic routes may not be input through the API (as the routes would then be static routes). In addition, the connection of two logical routers (e.g., a PLR and a TLR) causes the network controller to generate dynamic routes, as explained below.

In some embodiments, the state storage 610 stores a set of objects (or other data structures) that define logical networks managed by the controller 600. Based on commands received by the API 605, the controller 600 creates objects in the state storage 610. The state storage of some embodiments is a network information base (NIB) described in detail in U.S. Patent Publication No. 2013/0058356, which is incorporated herein by reference, although other embodiments use different storages for storing state information at the network controllers. In addition to storing the configuration state received through the API 605, the state storage of some embodiments also stores computed state calculated by the state computation module 615.

Furthermore, the network controller 600 may receive state information from (i) other network controllers and (ii) network elements (e.g., MFEs) through interfaces with these entities (not shown). In some embodiments, other logical controllers may receive configuration state through their APIs, and share the configuration state information with the controller 600 (e.g., through an RPC channel). In some such embodiments, the network controllers only share configuration state, and do not share computed state. This enables an administrator to input configuration data for a particular logical forwarding element or logical network into any of the network controllers, as the configuration data will be shared with the network controller that manages the particular logical forwarding element(s), and only that network controller will compute state for the logical network based on the input configuration state. The managed forwarding elements and namespaces hosting gateways may also provide state information (e.g., regarding links that are down, the amount of traffic processed for particular logical networks, etc.) to their managing physical controller (e.g., through one of the channels used to provision the MFE or namespace). When a physical controller receives this information, in some embodiments the controller identifies the appropriate logical controller to which to provide the data, which is then stored in the state storage of the controller (e.g., storage 610).

The state computation module (or set of modules) 615 of some embodiments allows the controller to compute additional state information based on (i) the configuration state received through the API, (ii) previously computed state (e.g., in a series of computations), and (iii) state propagated upwards to the network controller from the physical managed forwarding elements. In some embodiments, the state computation module 615 is a table mapping engine (e.g., the table mapping engine described above by reference to FIG. 1). The state computation module may also include a route processing engine for recursively traversing configuration state routes to generate computed state routes. In some embodiments, the state computation module generates dynamic routes based on a PLR-TLR connection, and stores these routes as input routes for the respective PLR and TLR.

The operation of the controller 600 to receive configuration state, including the attachment of a TLR to a PLR, and process that configuration state will now be described by reference to FIGS. 6-8. FIG. 6 conceptually illustrates the receipt of a logical network configuration 620 by the controller 600. As shown, the API 605 receives a configuration 620 for a logical network through one or more API calls. The logical network, as illustrated, includes two logical switches that attach to a logical router, which also connects to an external network (e.g., through a L3 gateway port). The logical switches include several ports to which VMs attach. In addition, the logical network configuration 620 indicates that one of the logical router ports connecting to a first logical switch is assigned the subnet 11.0.0.0/24 and the other logical router port connecting to a second logical switch is assigned the subnet 10.0.0.0/24. The logical router (a TLR) does not have a connection to an external network.

Though shown as a single set of data 620, in some embodiments the API 605 receives separate commands to create each of the logical forwarding elements (logical switch A, logical switch B, and the logical router). In addition, in some embodiments the attachment of each logical switch to the logical router is a separate command, as is the attachment of each VM to the logical switch.

FIG. 6 also shows that the API 605 creates objects 625-635 in the state storage 610 for the three logical forwarding elements. In some embodiments, the commands received by the API 605 instruct the API to create and/or modify these objects. The logical switch objects 630 and 635 of some embodiments store a list of logical ports, attachments to those logical ports, MAC addresses for the logical ports, etc.

As illustrated, the TLR object 625 of some embodiments includes its list of ports, which attach to the logical switches A and B. The TLR object 625 may specify whether the logical router is implemented in distributed or centralized fashion in some embodiments, as well as the type of logical router (i.e., TLR, or by setting a flag that indicates either tenant or provider). In addition, the API 605 creates a set of routes 640 as part of the logical router object. In some embodiments, each of the routes is also an object (owned by the logical router object) stored in the state storage 610. As shown, the set of routes includes routes automatically generated by the API 605 based on the logical network configuration 620. Specifically, for each of the logical ports (connecting to a logical switch, L3 gateway, etc.), the API 605 generates a connected high-priority route for the network address range (e.g., IP addresses) associated with that port. While shown as being performed by the API in this figure, in some embodiments the API simply creates the ports and connections in the state storage, and the state computation module 615 generates the connected routes based on the network address ranges specified for the ports.

In this case, one of the routes 645 is for the port to which logical switch A attaches. This route 645 routes network addresses that fall in the range (given in Classless Inter-Domain Routing (CIDR) format) 11.0.0.0/24 to the logical output port X. In addition, the route object of some embodiments specifies the type of route (e.g., connected, because the route is based on a specific logical port of the TLR), the action to take for packets with destination IP addresses in the prefix range (accept, in this case, though other routes may specify to drop packets), and the priority of the route. In some embodiments, connected routes are given the highest priority (1), with static routes a lower priority (though this may be manually input in some embodiments), and dynamic routes a still lower priority. In addition to the route 645, the set of routes also includes a similarly structured route to send IP addresses in the range 10.0.0.0/24 to logical output port Y.

Though not shown in this figure, the state computation module 615 of some embodiments identifies that the configuration state stored in the state storage 610 has changed, and subsequently retrieves this data in order to compute state information for distribution to the managed forwarding elements. The state computation module 615 generates flow entries and/or data tuples to distribute to the managed forwarding elements and namespaces, and distributes this computed information (e.g., via a set of physical controllers). The state computation module 615 also stores the computed state back into the state storage 610.

FIG. 7 conceptually illustrates the receipt by the controller 600 of input configuration data to attach the TLR, created as shown in FIG. 6, to a PLR. As shown, the input data (e.g., as input by an administrator) specifies a new logical port of the TLR having an IP address of 18.0.0.1 on a subnet 18.0.0.0/28. This port attaches to a logical port of the PLR having an IP address of 18.0.0.2 on the same subnet 18.0.0.0/28. Some embodiments place requirements on the connection of a TLR to a PLR. For example, some embodiments require that the two connected logical router ports be on the same subnet, and that the subnet is at least a "/30" subnet, in Classless Inter-Domain Routing (CIDR) format. That is, the shared subnet must have at least three bits for available different IP addresses. When the TLR-PLR connection is made improperly (e.g., the interfaces are on a different subnet, or the subnet is too specific), the API 605 of some embodiments generates an error message to return to the source of the configuration input.

Because in this case the configuration input to attach the TLR to the PLR is correctly specified, the API stores this connection between the ports in both the tenant logical router object 625 as well as a provider logical router object 705, which already exists in the state storage 610, as the provider logical router would have been created previously by an administrator of the managed network that is managed by the controller 600. For the TLR, the API stores a new logical port with the IP address 18.0.0.1, on the subnet 18.0.0.0/28. As such, either the API 605 or the state computation module 615 generates a connected route for all packets on the subnet 18.0.0.0/28 to be sent to the new logical port. In addition, the API 605 stores (e.g., as a property of the logical port) the connection to the PLR port with IP address 18.0.0.2. For the PLR object 705, the API 605 stores a new logical port if the port was not already created on the PLR (and similarly generates a connected route to the subnet). Furthermore, the API 605 stores the connection to the TLR port having IP address 18.0.0.1

As a result of the connection, the state computation module 610 (e.g., the table mapping engine component) identifies the updates to the TLR object 625, and retrieves the connection data 710 for the TLR. As a result, the state computation module 610 generates a new dynamic default route 715 for the TLR, and stores this information in the input routing table 640 of the TLR 625. As shown, the dynamic default route 715 sends all packets (using the prefix 0.0.0.0/0) to the IP address of the PLR, 18.0.0.2. Some embodiments set a low priority (e.g., using a high number) for this route. This allows the user to specify a static default route that will have the same specificity (0.0.0.0/0) but a higher priority, for outgoing packets. For instance, a user might use a direct host return port to send outgoing packets from the logical network directly to a physical router outside the managed network, rather than using the PLR gateways (which are a potential bottleneck). Such direct host return ports of some embodiments are described in U.S. patent application Ser. No. 14/068,658, filed Oct. 31, 2013 and now published as U.S. Patent Publication 2015/0103838, which is incorporated herein by reference.

FIG. 8 conceptually illustrates the result of the TLR-PLR connection as it pertains to the PLR data 705. As indicated above, when the API 605 receives the connection, this data is stored in both the TLR object 625 and the PLR object 705. The update to the PLR is also identified by the state computation module 615, which retrieves the data for the PLR, and generates new dynamic routes for the PLR. These routes, in some embodiments, are based on the connected routes of the TLR, and specify the TLR port IP address 18.0.0.1 as the next hop. For example, the route 805 stored for the PLR 705 corresponds to the connected route 645 for the TLR 625. The dynamic route 805 is for routing packets with network addresses in the range 11.0.0.0/24, and specifies the IP address 18.0.0.1 as the next hop. The PLR should already have a connected route for the prefix 18.0.0.0/28, to output packets matching this prefix to a particular logical port. In addition to this route 805, the state computation module generates a route to also send packets with addresses in the range 10.0.0.0/24 to the same IP address 18.0.0.1. Because the TLR connected route for the prefix 18.0.0.0/28 specifies the same subnet to which the PLR connects, this TLR connected route is not propagated as a dynamic route to the PLR.

This figure assumes that the controller 600 is the master controller for both the TLR and the PLR. If, on the other hand, a different controller is the master for the PLR, then the state computation module 610 would not compute the dynamic routes for the PLR. Instead, as the controller 600 would have shared this data with other controllers in the network control system (including the master controller for the PLR), the PLR master controller would compute the dynamic routes for the PLR (and perform the subsequent route processing for the PLR to identify the output routing table for the PLR).

Figure 9:
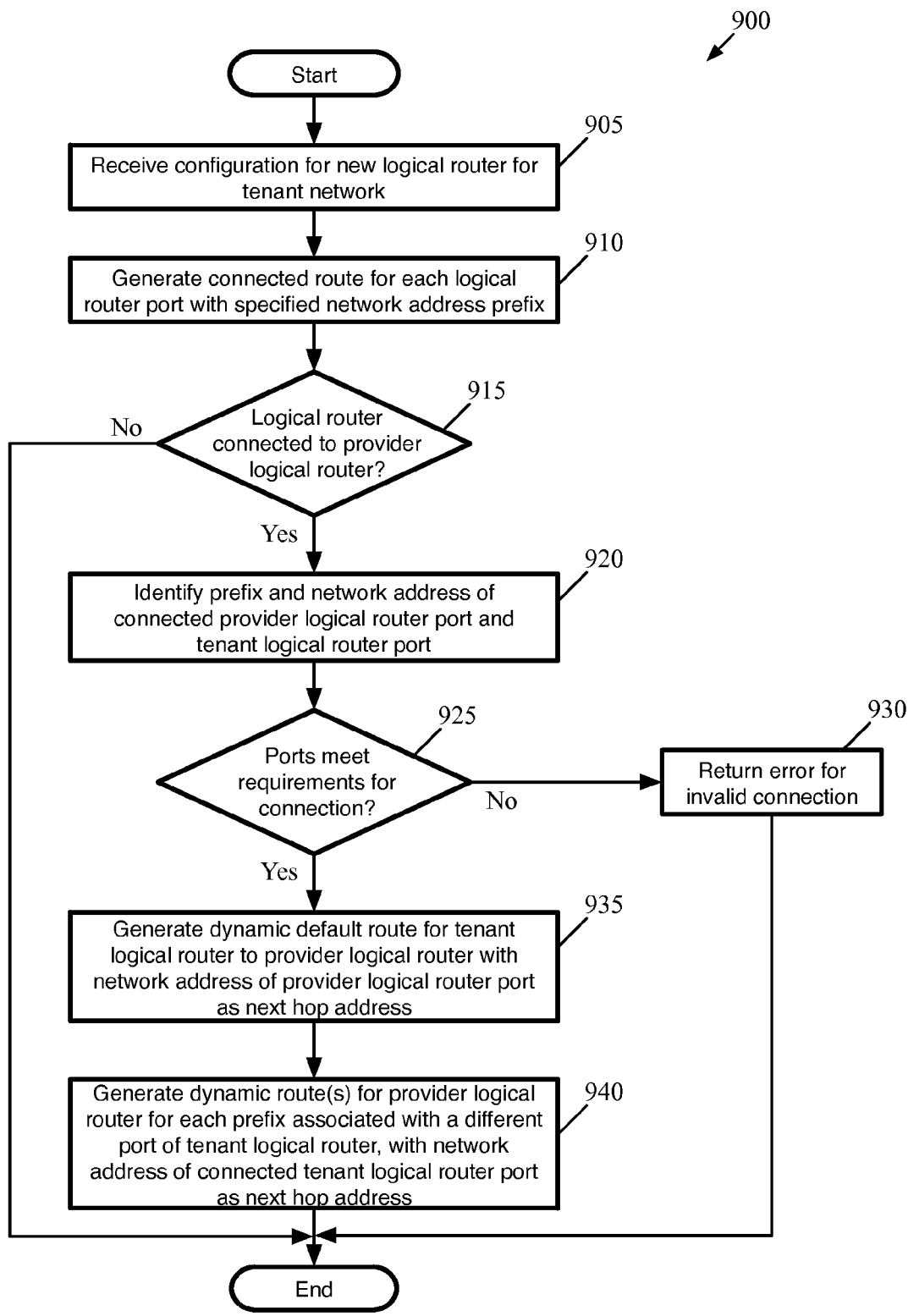
FIG. 9 conceptually illustrates a process of some embodiments for implementing a PLR-TLR connection, as performed by a network controller that is the master of both the TLR and the PLR.

FIG. 9 conceptually illustrates a process 900 of some embodiments for implementing a PLR-TLR connection, as performed by a network controller that is the master of both the TLR and the PLR. As in the above example, this figure assumes that the controller performing the process 900 is the master of both the PLR and TLR.

As shown, the process 900 begins by receiving (at 905) a configuration for a new logical router for a particular tenant network. In some embodiments, the controller receives this configuration data through an API call to create a new logical router, as well as additional calls to configure ports of the logical router (e.g., with MAC addresses, IP addresses, and subnets), attach logical switches to some of the new ports, and/or connect a port to an existing provider logical router. Some embodiments specify the existence of one or more provider logical routers to tenants. For example, through the API, some embodiments allow tenant administrators to query for PLRs available to accept connections with the TLR.

Based on the configuration information, the process generates (at 910) a connected route for each port of the new logical router using the specified network address prefix of the subnet to which the port is connected. Thus, in the above example, the logical port X (identified at the network controller by, e.g., a UUID) is associated with the subnet 11.0.0.0/24, and therefore the controller 600 generates a connected route to send packets for this subnet to the port X of the logical router. The process 900 generates similar routes for each of the logical ports of the new TLR.

Next, the process determines (at 915) whether any connection to a PLR is specified for any of the ports of the TLR. When no such connection is specified, the process ends. In some embodiments, if the datacenter tenant wants the logical network to receive packets from external networks, then a connection to a PLR is required (i.e., because tenants may not have connections to L3 gateways). However, a tenant administrator might initially specify the logical router, then attach the TLR to a PLR at a later time (at which point the remainder of process 900 would be performed).

When the specified logical router includes a connection to a PLR, the process identifies (at 920) the prefix and network address of the TLR port and PLR ports that are connected. This process, in some embodiments, is performed by the API upon receiving the specification of the connection. That is, some embodiments perform operation 920 prior to operation 910 when a TLR to PLR connection is specified as part of the received configuration data.

The process determines (at 925) whether the ports meet a set of specified requirements for the PLR-TLR connection. For example, some embodiments require that the ports have different IP addresses, that the ports have the same prefix assigned, and that this prefix not overly specific. For instance, some embodiments require that the prefix be at least "/30", i.e., that the prefix have three bits available for IP addresses. Other embodiments do not place any such requirements on the size of the subnet. When the ports do not meet the connection requirements, the process returns (at 930) an error for an invalid connection. Some embodiments return an error message to the source of the command (e.g., a management application, an administrator computer, etc.) that attempted to create the PLR-TLR connection. The process then ends.

Next, the process generates (at 935) a dynamic default route for the TLR that specifies the network address of the PLR port as the next hop address. That is, the route sends all packets that do not match any other routes at the TLR (using the prefix 0.0.0.0/0) to the PLR. As the TLR already includes a connected route to output packets for the prefix containing this next hop address to the TLR port connected to the PLR, then route processing by the network controller will resolve this route to a default route to output all otherwise unrouted packets to the logical port that connects to the PLR.

In addition, for the PLR, the process 900 generates (at 940) a dynamic route for each prefix associated with the other ports of the TLR. The process then ends. These dynamic routes specify the connected port of the TLR as the next hop address. The route 805 in the above example is such a route. Because the TLR has a connected route for the prefix 11.0.0.0/24, the PLR receives a dynamic route for this prefix, with the next hop IP address 18.0.0.1. Whenever the administrator for the TLR adds a new logical port, the controller generates a new connected route for the TLR, and subsequently a new dynamic route for the connected PLR. As the PLR will already have a connected route to output packets for the prefix containing the next hop address of the dynamic routes to the PLR port connected to the TLR, then route processing by the network controller will resolve the dynamic routes of the PLR to output packets sent to network addresses in the TLR subnets to the logical port that connects to the TLR.

Though not shown in these figures, as described above by reference to, e.g., FIGS. 4 and 5, the network controllers, in addition to generating routes, storing the routes, and performing route processing for the logical routers, also generates and distributes data to the various managed network elements that implement the logical networks within a managed network. These network elements include managed forwarding elements (MFEs) and managed L3 gateways in some embodiments. As the TLRs are implemented in distributed fashion in some embodiments, the controller (or set of controllers) generates flow entries for the appropriate MFEs (i.e., those at the host machines on which the VMs of the tenant network reside) in order for the MFEs to implement the TLR (and the tenant logical switches). When the TLR is connected to a PLR, the controller (or set of controllers) generates flow entries for the PLR for those MFEs as well. The PLR flow entries are distributed to host machines at which VMs of other logical networks connected to the PLR reside. In addition, the network controller generates data tuples to define and configure one or more L3 gateways for the PLR (e.g., one L3 gateway for each port of the PLR that connects to an external network.

The flow entries for the MFEs follow a match-action format in some embodiments. That is, each flow entry specifies (i) a set of match conditions (e.g., source and/or destination MAC addresses, source and/or destination IP addresses, logical context data such as ingress or egress ports of specific logical forwarding elements, etc.) and (ii) a set of actions to perform on the packet (e.g., write data to a register, resubmit packet, encapsulate the packet in a specific tunnel header, etc.).

In some embodiments, the network control system distributes flow entries to the MFEs in order for the MFEs to perform first-hop processing. For first-hop processing, the first MFE that receives a packet (e.g., the MFE on the same host as the VM that sent the packet, or the MFE on a gateway host for incoming packets) performs as much of the logical pipeline as possible for a packet before sending the packet out over the managed network. For traffic between VMs in a logical network, the first-hop MFE typically identifies a logical egress port, of a logical switch, that corresponds to the destination address. If the two VMs are on different logical switches, then the first-hop MFE performs the logical processing pipelines for the source logical switch, logical router (e.g., a TLR), and the destination logical switch.

Figure 10:
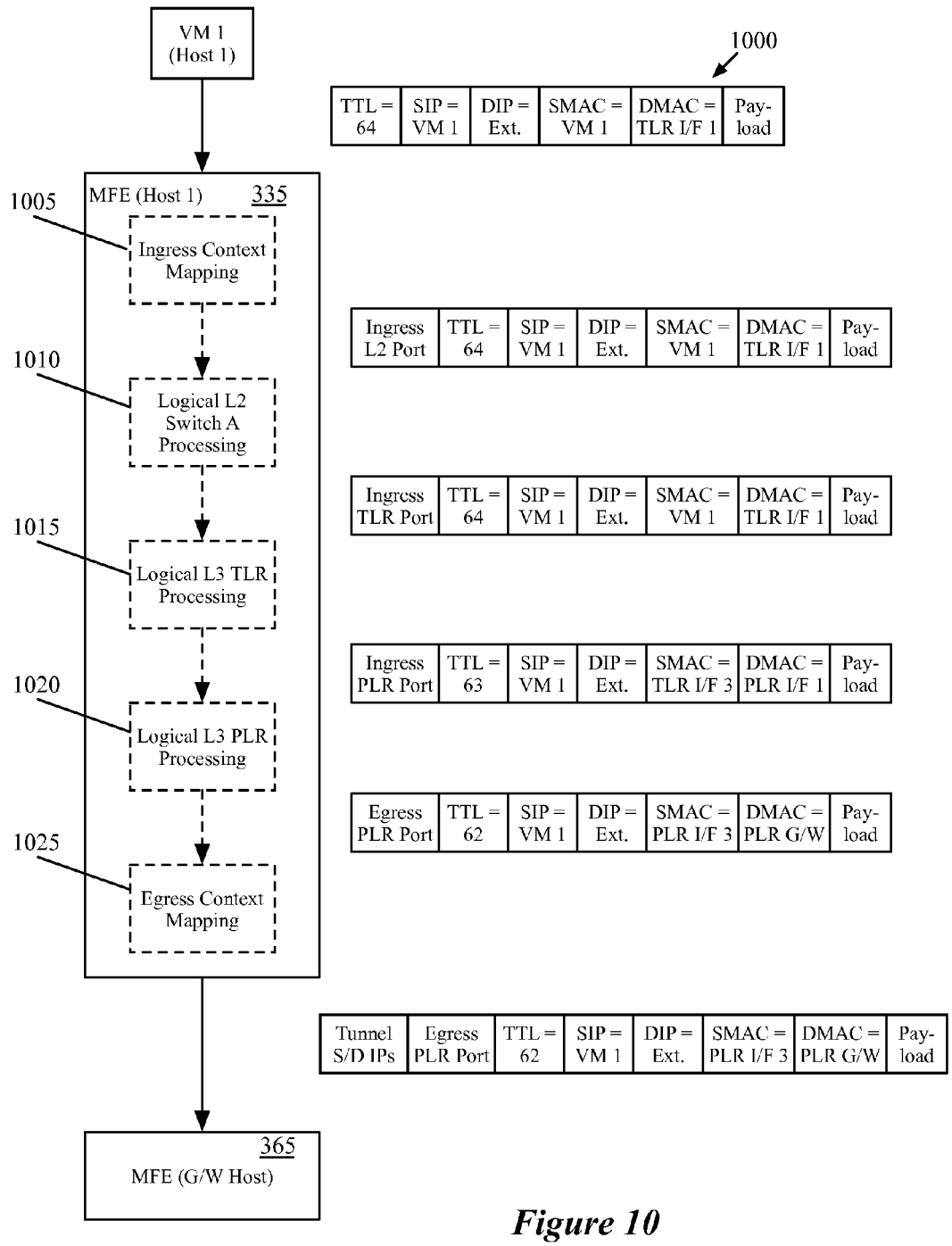
FIGS. 10 and 11 conceptually illustrate the packet processing by a first-hop MFE for two different packets that are processed by the PLR shown in FIG. 2, as implemented in the managed network shown in FIG. 3.
Figure 11:
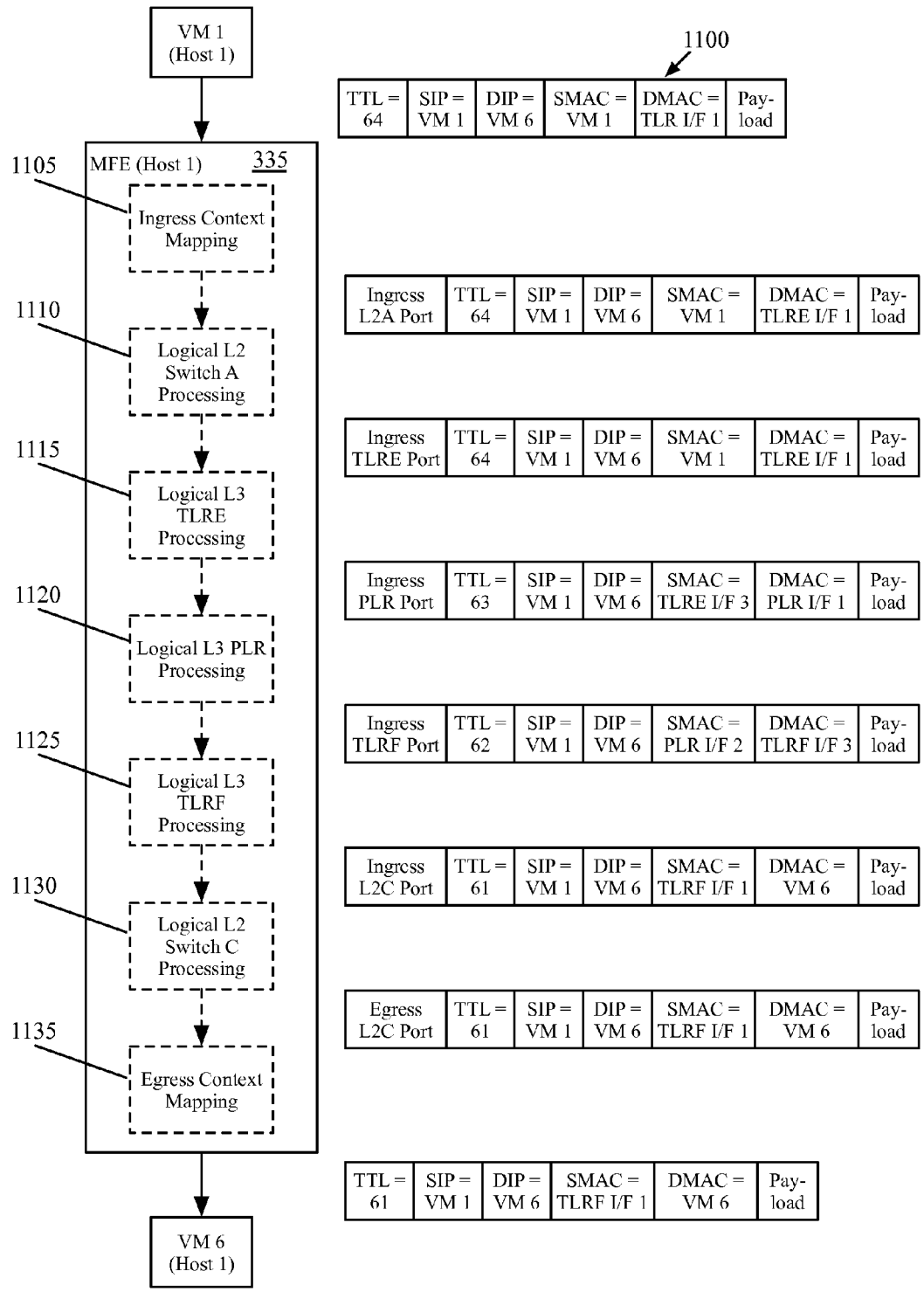

FIGS. 10 and 11 conceptually illustrate the packet processing by a first-hop MFE for two different packets that are processed by the PLR 220 shown in FIG. 2, as implemented in the managed network 300. Each of these figures illustrates a packet sent by a VM, in various stages as that packet is manipulated by various processing pipelines in the first-hop MFE. Each processing pipeline represents a set of flow entries stored by the MFE and used to process the packet. For the processing for a particular logical forwarding element (e.g., a logical switch processing), the pipeline may represent multiple entries (e.g., ingress ACL, logical forwarding, and egress ACL).

The first example, shown in FIG. 10, illustrates a packet 1000 sent by VM 1 to an external destination. As shown, VM 1 initially sends a packet 1000 to the MFE 335 (e.g., through a VNIC). Both the VM and the MFE 335 are located at the host 305. The packet 1000 includes a payload, source and destination MAC addresses, source and destination IP addresses, and a time to live (TTL) counter. As sent by the VM, the source MAC and IP addresses are those of VM 1, the destination MAC address is that of the TLR 215 to which the logical switch 205 attaches (the default gateway for the VM), and the destination IP address is an external address located outside the logical network.

At the MFE 335, the first stage of processing performed on the packet 1000 is ingress context mapping 1005. The ingress context mapping stage 1005 represents one or more flow entries that identify a logical context for the packet 1000. In some embodiments, the ingress context mapping flow entry identifies a particular logical port of the logical switch 205 based on the physical ingress port through which the packet was received (e.g., the VNIC by which the VM 1 attaches to the MFE 335).

While processing a packet, the MFE 335 of some embodiments stores the packet data in registers. That is, up on receiving a packet, the various components of the packet are written into register fields for access during processing. The MFEs repeatedly match the packet to a flow entry, perform the action(s) specified by the flow entry, then resubmit the packet through a dispatch port for additional processing, while keeping the data in registers associated with the packet. In the case of the ingress context mapping, the flow entry specifies to write the identified logical ingress port (of the logical switch 205) into a register.

Based on the ingress context mapping, the MFE 335 then performs the logical L2 processing pipeline 1010 of the logical switch 205. In some embodiments, this processing pipeline involves an ingress ACL (e.g., to ensure that the source MAC and/or IP address of the packet match the logical port specified by the ingress context mapping entry), a logical forwarding decision, and an egress ACL entry. In some embodiments, the logical forwarding decision for an L2 pipeline uses the destination MAC address to identify a logical egress port of the logical switch 1010, and the egress ACL entry determines whether to allow the packet through the identified egress port (e.g., based on the destination MAC and/or IP address). This egress port connects to a logical port of the TLR 215, and therefore another flow entry specifies the TLR ingress port in a register field for the packet 1000, as shown on the right side of the figure. At this point, only the logical context of the packet has been modified, as the MAC addresses, IP addresses, and TTL fields remain unchanged.

Based on the specified TLR ingress port, the MFE 335 next performs the logical L3 processing pipeline 1015 of the tenant logical router 215. In some embodiments, like the logical switch processing, the L3 processing pipeline involves an ingress ACL entry, a logical forwarding decision, and an egress ACL entry. In some embodiments, the ingress ACL entry ensures that the source MAC and/or IP addresses of the packet are allowed for the ingress port. The flow entries for the logical forwarding decision implement the TLR routing table as determined by the network controller. That is, the logical forwarding flow entries stored by the MFE include entries for each of the connected routes to the different logical switches, as well as the default route to the PLR. In this case, because the destination IP address is an external address (i.e., not in either of the subnets associated with the logical switches 205 and 210), the packet 1000 matches a flow entry specifying the TLR logical port that connects to the PLR as the logical egress port. As this egress port connects to the logical port of the PLR 220, another flow entry specifies the PLR ingress port in a register field for the packet 1000, as shown on the right side of the figure.

In addition, as part of the logical forwarding flow entry (or entries), the MFE 335 modifies the packet during the processing stage 1015. Specifically, as the packet has now been processed by a router, the MFE decrements the TTL by one. In this example, the packet 1000 initially has a TTL of 64, which is decremented once by each router that processes the packet. Different embodiments may use different initial TTLs (e.g., 255, 100, etc.). In addition, as part of routing the packet, the processing pipeline 1015 changes the source and destination MAC addresses of the packet. Specifically, the source address is now that of the TLR egress port, and the destination MAC is now that of the PLR ingress port. The TLR flow entries indicate that the next hop IP address for the utilized route is that of the PLR ingress port. Rather than using Address Resolution Protocol (ARP), because the logical network is known to the controller that generates the flow entries, the ARP response (with the MAC address to be used as the destination MAC for the packet 1000) can be directly embedded in the flow entry to begin with in some embodiments.

Next, based on the specified PLR ingress port, the MFE 335 performs the logical L3 processing pipeline 1020 of the provider logical router 220. In some embodiments, like the TLR processing, the PLR processing pipeline 1020 involves an ingress ACL entry, a logical forwarding decision, and an egress ACL entry. Much like with the TLR, the ingress and egress ACL ensure that the packet should be allowed in the identified ingress port of the PLR and out of the egress port identified by the logical forwarding entry. The logical forwarding entries implement the routing table of the PLR as determined by the network controller. Thus, the PLR flow entries include entries for forwarding packets with destination IP addresses in the logical switch subnets to the PLR port that connects to the appropriate TLR for the logical switch subnet (based on the dynamic routes propagated to the PLR), as well as routes for sending other packets to one or more gateway ports of the TLR. In this case, because the destination IP address is an external address, the PLR does not route the packet to any of the TLRs to which it connects. Instead, based on either its default route, static routes input for the PLR through the API, or dynamic routes learned from external physical routers through route advertisement protocols (e.g., BGP, OSPF, etc.), the PLR forwarding entries identify one of the gateway ports of the PLR as the logical egress port.

In addition, as with the TLR, the MFE 335 modifies the packet 1000 during the processing stage 1020. Specifically, the TTL has been decremented again, such that it now has a value of 62. Even though only one physical forwarding element (the MFE 335) has processed the packet, its TTL has been decremented twice during that processing. In addition, the PLR has modified the source and destination MAC for the packet again (e.g., by modifying register values). The source MAC is now that of the L3 gateway port for the logical router, and the destination MAC is the L3 gateway itself (which, in some embodiments, is assigned a MAC separate from the logical port). Using the L3 gateway MAC for the destination address ensures that when the MFE at the gateway host machine receives the packet, that MFE will send the packet to the appropriate namespace for gateway processing. Again, rather than the MFE 335 determining this MAC address through ARP, the network controller directly embeds the destination MAC address information into the flow entries.

Finally, at this point the egress port identified based on the logical forwarding portion of the PLR processing does not map to another logical forwarding element flow table implemented by the MFE 355 at the host 305. Instead, the packet now matches an egress context mapping flow entry that maps the packet to a physical destination (i.e., a particular gateway host machine). In addition, a physical forwarding flow entry (which may be part of the egress context mapping, or a separate flow entry) specifies the actual tunnel information to use in order to reach the MFE at this gateway host machine. As such, before sending the packet out of the host 305 and into the managed network, the MFE 335 encapsulates the packet in a tunnel (e.g., using STT, GRE, or another tunnel encapsulation technique). This is shown in the figure by the tunnel source and destination IP addresses. The logical context is also maintained on the packet (e.g., stored within a particular field of the tunnel header), for use by the MFE at the gateway host machine.

The MFE 335 sends the encapsulated packet out into the managed network to the gateway host machine. In some embodiments, the MFE 365 at the gateway host machine forwards the packet to the namespace that implements the L3 gateway, having removed the tunnel encapsulation and logical context data. The namespace performs its processing to route the packet for delivery to a particular physical router, and then sends the packet back to the MFE, which handles the output of the packet onto the connection with the physical network.

FIG. 11 conceptually illustrates an example of a packet 1100 processed by both TLRs and the PLR at the first hop, as the packet is sent from VM 1 on the logical network 200 to VM 6 on the logical network 250, both of which reside on the host 305. As shown, the packet 1100 has the same source IP and MAC addresses (those of VM 1), same destination MAC address (the TLR port), and same initial TTL as the packet 1000. However, the destination IP address is that of VM 6, and the payload would presumably be different as well.

At the MFE 335, the first three stages (ingress context mapping 1105, logical L2 processing 1110 for the logical switch 205, and logical router processing 1115 for the TLR 215) are the same as in the example of FIG. 10. For processing by the TLR 215, the destination IP of VM 6 is treated the same as an external IP, as it is not on any of the subnets connected to the TLR 215. After the pipeline 1115, the TTL has been decremented to 63, the source MAC is that of the TLR egress port, and the destination MAC is that of the PLR ingress port.

The L3 processing pipeline 1120 of some embodiments for the PLR 220 involves an ingress ACL, logical forwarding decision, and an egress ACL. However, unlike in the previous example, this time the packet 1100 matches a flow entry implementing a dynamic route with the TLR 265 of the logical network 250 as the next hop. The IP address of VM 6 (the destination address of the packet 1100) is in the subnet associated with the TLR port connecting to the logical switch 255, and therefore the packet matches the flow entry implementing the dynamic route propagated to the PLR for this subnet. As such, in addition to decrementing the TTL to 62, the PLR processing 1120 sets the source MAC of the packet to that of the PLR port connected to the TLR 260, and sets the destination MAC of the packet to that of the TLR port connected to that PLR port. The processing subsequently identifies this TLR port as the new ingress port stored with the logical context of the packet.

The MFE 335 then performs the logical L3 processing stage 1125 for the TLR 265, based on this logical ingress context. As with the previously described logical router pipelines, the L3 processing 1125 involves an ingress ACL, logical forwarding, and an egress ACL. In this case, the logical forwarding decision identifies the destination IP address (of VM 6) as belonging to a subnet for which a flow entry implements a connected route (to the logical router port to which the logical switch 205 attaches). Based on this IP address, the logical forwarding entry (or entries) specifies to identify the egress port of the logical router, decrement the TTL to 61, and modify the source and destination MAC addresses. The source MAC address is changed to that of the TLR port attached to the logical switch, and the destination MAC address is changed to that of VM 6. Rather than sending an actual ARP request to VM 6 to determine its MAC address, in some embodiments the MFE already stores this information.

Finally, the MFE 335 performs logical L2 processing 1130 for the logical switch 255. Here, the only changes made to the packet are to identify a logical egress port of the logical switch (based on the destination MAC address that corresponds to VM 6), and write this information into a register. At the egress context mapping stage 1135, the MFE 335 maps this egress port to a physical destination (the attached VM), and subsequently delivers the packet (without a logical context) to the destination VM.

III. Dynamic Routing in Controllers

The above section described the use of provider logical routers and tenant logical routers, which exemplified one specific example of a network controller performing logical dynamic routing. In some embodiments, the only types of network controller connections allowed are those between PLRs and TLRs, as described above. However, the network control system of some embodiments provides users with the ability to create multiple logical routers as part of a single logical network, and connect these routers to each other. This enables the administrator of the tenant network to assign different policies to different logical routers. For example, for packets from a first logical switch, the tenant might want to use policy routing to route packets based on size, while for packets from second and third logical switches the tenant might not care about the size of the packets. Connecting these logical switches to two different logical routers allows the tenant to easily implement the different policies at the different logical routers.

Figure 12:
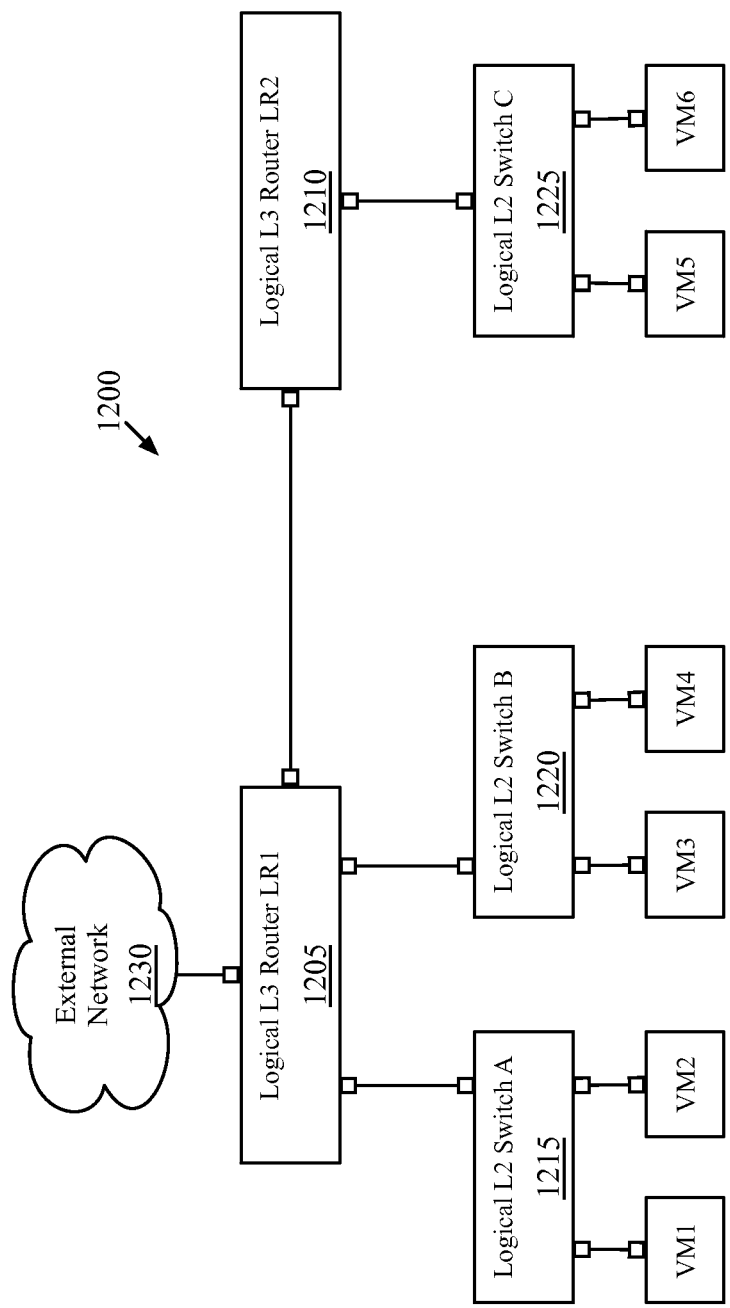
FIG. 12 conceptually illustrates an example logical network that includes two connected logical routers, for which dynamic routing is enabled.

FIG. 12 conceptually illustrates an example logical network 1200 that includes two connected logical routers 1205 and 1210, for which dynamic routing is enabled. As shown, the first logical router 1205 has two logical switches 1215 and 1220 attached, and also includes a L3 gateway port connecting to an external network 1230. The second logical router 1210 has one logical switch 1225 attached. Whereas in the PLR-TLR connection example only certain routes are dynamically propagated between logical routers by the network controller, in some embodiments all routes (connected, static, and even dynamic routes from other logical routers or external routers) may be propagated between the routing tables of the logical routers.

Figure 13:
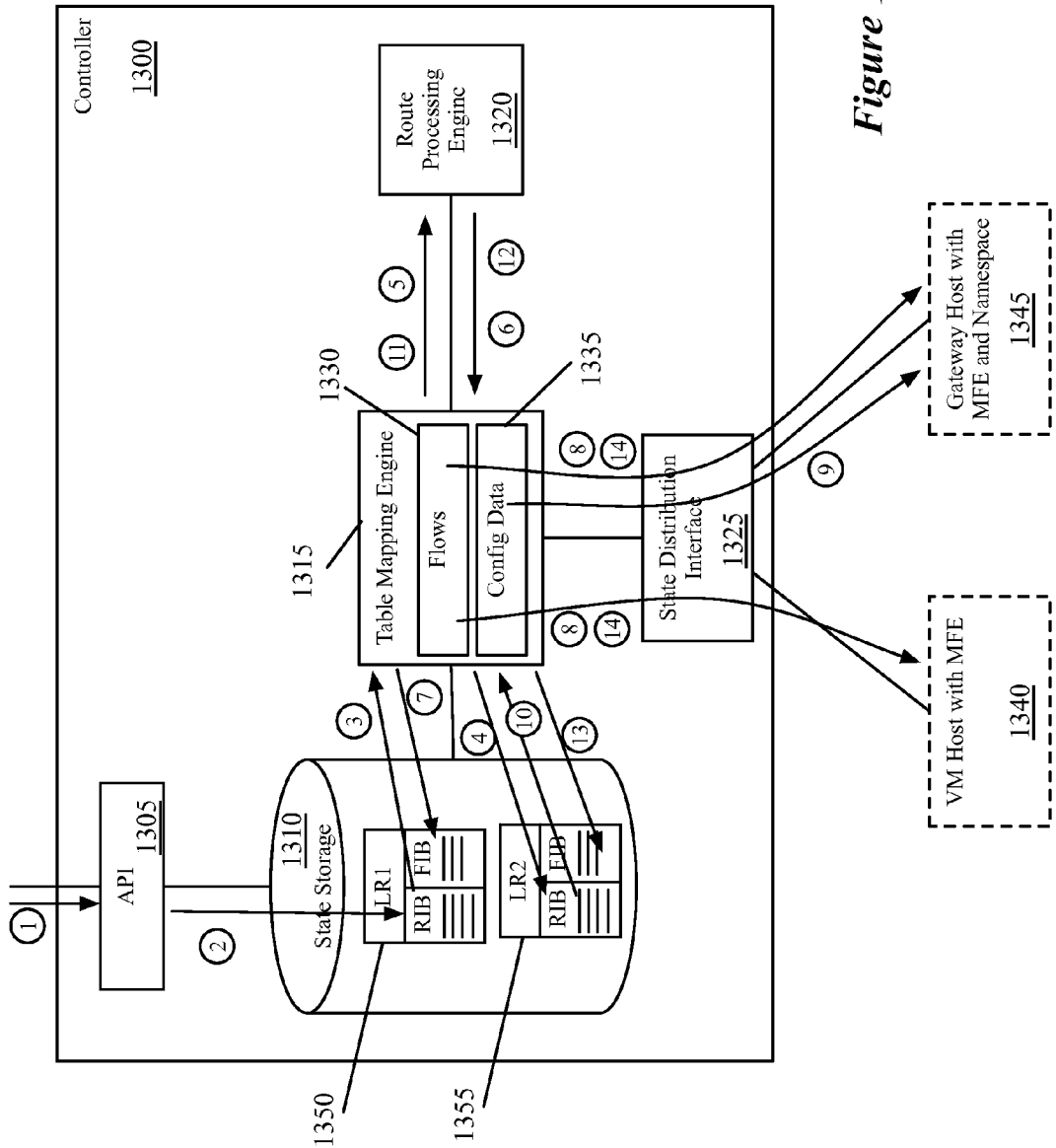
FIG. 13 conceptually illustrates a network controller of some embodiments, and the data flow through the controller as the controller performs logical router processing upon the receipt of a new route for the logical router.
Figure 14:
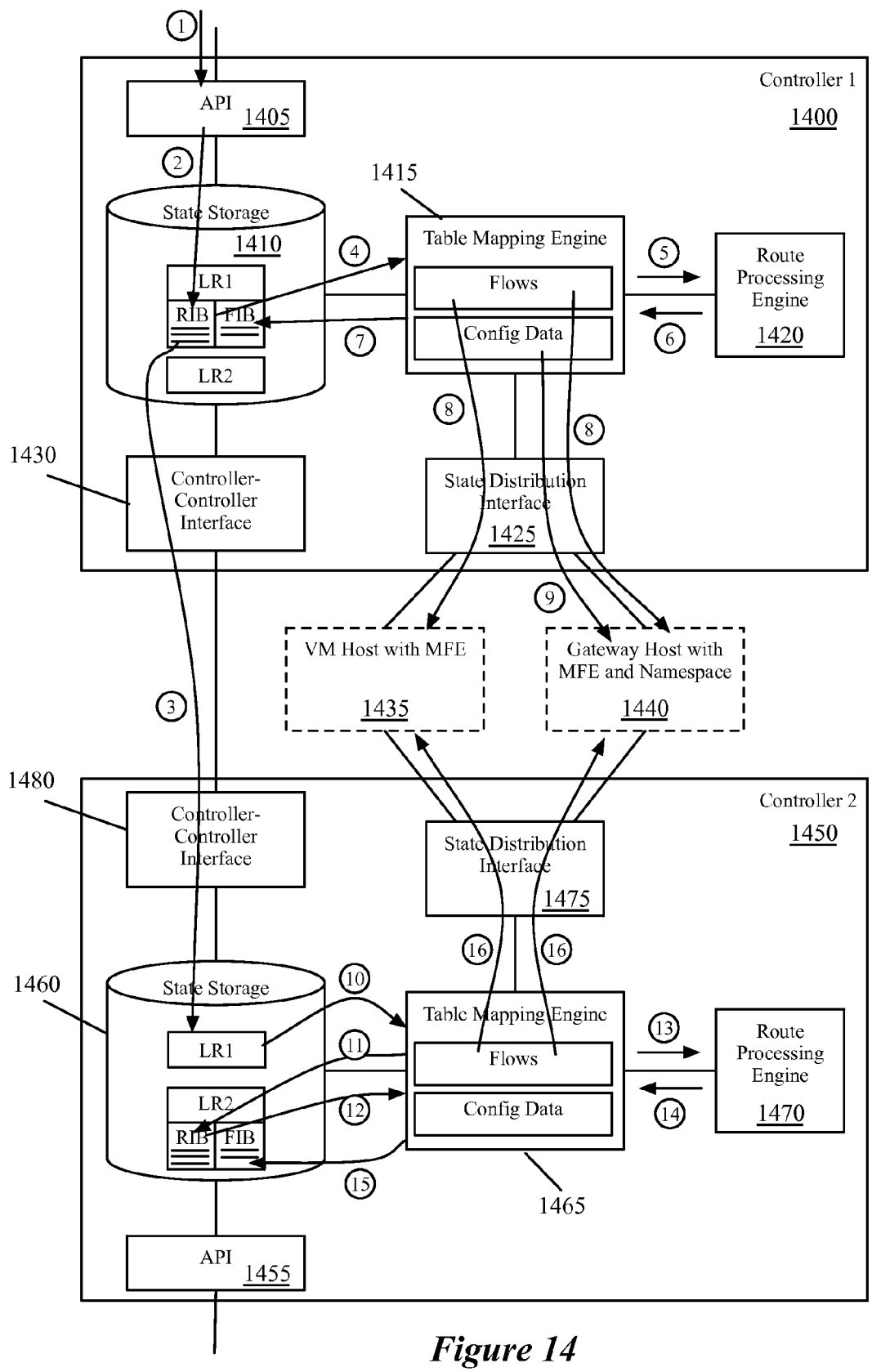
FIG. 14 conceptually illustrates two network controllers, which are respectively the master controllers for the first and second logical routers, as well as the data flow through the controllers upon receipt at the first controller of a new route for the first logical router.

FIGS. 13 and 14 conceptually illustrate two different examples of the data flow through a set of network controllers as the set of controllers performs dynamic routing, route processing, and data tuple generation and distribution for the logical routers 1205 and 1210. In FIG. 13, the two logical routers 1205 and 1210 have the same master controller, whereas in FIG. 14 they are managed by two different master controllers.

FIG. 13 conceptually illustrates a network controller 1300 of some embodiments, and the data flow through the controller as the controller performs logical router processing upon the receipt of a new route for the logical router 1205. As mentioned, in this example the network controller 1300 is the master controller for both of the logical routers 1205 and 1210. The network controller 1300 includes an API 1305, a state storage 1310, a table mapping engine 1315, a route processing engine 1320, and a state distribution interface 1325, similar to the network controller 100 described above.

The API 1305 provides an interface through which the controller receives configuration state data for one or more logical forwarding elements. As described above by reference to FIG. 6, in some embodiments the API 1305 represents a set of methods that may be used to create, modify, delete, query, etc. logical network data in the state storage 1310. In some embodiments, a network administrator may access the controller through a direct connection (e.g., by manually inputting the API calls) or through a cloud management application. Some such API methods for the API 1305 include methods to create a logical router, create logical router ports, create a logical switch, attach a logical switch to a logical router, attach a logical port to an external network, attach logical router ports of two routers to each other, create a static route, query a logical router for its routes, etc. These various methods, in some embodiments, enable the administrator to access or modify configuration state data for logical routers stored in the state storage 1310.

In some embodiments, the state storage 1310 stores a set of objects that define logical forwarding elements managed by the controller 1300, as well as configuration state for logical forwarding elements managed by other network controllers. Based on commands received by the API 1305, the controller 1300 creates, modifies, and deletes objects in the state storage 1310. In addition to storing the configuration state received through the API 1305, the state storage of some embodiments also stores computed state calculated by the state computation module 1315 (e.g., dynamic input routes generated by the table mapping engine, output routes generated by the route processing engine, etc.). Furthermore, the network controller 1300 may receive state information from other network controllers and network elements (e.g., MFEs, gateways operating in namespaces), as described above by reference to FIG. 6.

The table mapping engine 1315 performs state calculations for logical networks managed by the controller 1300. As shown, the table mapping engine 1315 includes a flow generation module 1330 and a configuration data generation module 1335, both of which generate data for distribution to the managed forwarding elements and L3 gateways. In some embodiments, both of these modules use similar input data tuples to generate output data tuples, but generate different data for distribution to the various network elements. In addition, the table mapping engine 1315 performs dynamic routing for connected logical routers in some embodiments. The table mapping engine of some embodiments uses database join operations to generate the data tuples describing dynamic routes, and then stores these dynamic routes as objects in the state storage 610. For example, for a first logical router connected to a second logical router that itself has a connected route, the table mapping engine of some embodiments would perform an operation to join the prefix of the connected route with the port of the second logical router as a next hop IP address to create a dynamic route for the first logical router.

The flow generation module 1330 generates data for the managed forwarding elements to use in processing packets. Specifically, in some embodiments the flow generation module 1330 generates flow entries that take a match-action format. That is, each flow entry specifies a condition or set of conditions for a packet to match and an action or set of actions for a managed forwarding element to apply to the packet when the packet matches all of the conditions. For instance, one of many flow entries used to implement a logical router might specify that if a packet (i) has been assigned to the logical router and (ii) has a destination IP address in a particular range (e.g., 10.0.0.0/24), then take the actions of (i) writing a particular logical egress port into a register for the packet and (ii) resubmit the packet to the managed forwarding element for further processing. In some embodiments, the flow generation module 1330 generates the flow entries by performing table mapping operations (e.g., join operations) on the data stored in the state storage 1310, as well as information received from the route processing engine 1320. In some embodiments, the flow generation module 1330 of the table mapping engine 1315 outputs data for distribution via the OpenFlow protocol.

The configuration data generator 1335 generates data for both the managed forwarding elements as well as the namespaces in which logical routers and L3 gateways operate, in some embodiments. For the managed forwarding elements, the configuration data may include port and/or tunnel configuration, among other data. Whereas the MFEs receive packet processing data as flow entries, however, the namespaces that implement L3 gateways for distributed logical routers receive packet processing instructions in the format of data tuples distributed in the same manner as configuration data. For instance, for a namespace, the gateway host machine on which the namespace resides receives the definition of the namespace as a data tuple generated by the configuration data generator 1335, and receives its routing table and other network stack configuration in this format as well, in some embodiments. As with the flow generation module 1330, the configuration data generator 1335 of some embodiments generates configuration data by performing table mapping operations (e.g., join operations) on the data stored in the state storage 1310, as well as information received from the route processing engine 1320. In some embodiments, the configuration data generator 1335 outputs data for distribution via the OVSDB protocol.

The route processing engine 1320 of some embodiments receives a set of input routes from the table mapping engine 1315 (e.g., routes automatically generated based on the subnets to which the logical ports of the logical router connect, static routes received through the API 1305, dynamic routes generated by the table mapping engine 1315 based on logical router connections) and performs a recursive traversal process on the routes in order to identify a final logical destination for each network address range routed by the logical router. When multiple input routes provide contradictory information for a particular network address or range of addresses, the route processing engine 1320 of some embodiments determines which route has a higher priority. Some input routes may provide a next hop address rather than output port for a route. In these cases, the route processing engine recursively traverses the set of input routes until reaching a route specifying either a destination output port or a drop packet action. The route processing engine 1320 returns the set of output routes, with final actions (e.g., drop packet, send to particular output port) specified for each route. In some embodiments, the route processing engine 1320 is implemented in a language different from the table mapping engine 1315 (e.g., C++).

The controller 1300 distributes the flow entries and configuration data for the logical router (and other data for, e.g., other logical forwarding elements, such as the logical switches of the logical network) generated by the table mapping engine 1315 to host machines via the state distribution interface 1325. The host machines shown in the figure include a first machine 1340 for hosting VMs and a second machine 1345 for hosting namespaces to implement L3 gateways. Both of the host machines 1340 and 1345 include managed forwarding elements for processing packets (e.g., OVS), while the gateway host 1345 also includes the namespaces for the L3 gateways.

In some embodiments, the controller 1300 distributes the data through a hierarchy of other network controllers, as shown above in FIG. 4. In such embodiments, the state distribution interface is an interface with other controllers that act as intermediaries for the distribution of data to the host machines (and possibly perform additional translation of the data tuples). In some embodiments, the controller 1300 uses a Remote Procedure Call (RPC) channel to communicate with other controllers.

In other embodiments, the controller 1300 interfaces directly with the host machines 1340 and 1345 (as well as numerous other host machines) to distribute the data. In some such embodiments, the controller uses two channels for communication with each host machine: a first channel (e.g., OpenFlow) for distributing the flow entries generated by the flow entry generation module 1330 for use by the managed forwarding elements, and a second channel (e.g., OVSDB) for distributing the configuration data generated by the configuration data generator 1335.

The data flow through the network controller 1300 during its operation to process logical router information will now be described. FIG. 13 includes several encircled numbers, which indicate the flow of different data into, through, and out of the network controller 1300. One of ordinary skill in the art will recognize that the controllers of some embodiments will process data other that that which is shown, and that the data flow in this figure is meant to represent the operations performed and data transferred specifically relating to the two logical routers managed by the network controller 1300.

As shown by the encircled 1, the API 1305 receives a command to create or modify the configuration of the logical router 1205. Specifically, in this example the command modifies the routes stored for the logical router 1205. The command could be the creation of a new static route, the creation of a new port for the logical router, the modification of the subnet to which a logical port connects, etc.

As a result, shown by the encircled 2, the API 1305 modifies the data structure 1350 stored for the logical router 1205 (e.g., an object, such as a C++ object) in the state storage 1310. The figure illustratively shows the logical router data structure 1350 as storing a RIB (set of input routes) and FIB (set of output routes). While some embodiments use such a structure, other embodiments store data structures (e.g., objects) for each input route, owned by the logical router. After processing, in some such embodiments the logical router also stores a status data structure (e.g., object) for each route. Other such embodiments modify the route data structure after processing to include the status data.

When the configuration state of the logical router data structure 1350 is modified, the table mapping engine 1315 retrieves the state of the logical router, as shown by the encircled 3 in the figure. The table mapping engine 1315 performs several operations based on this new configuration data. Because the controller 1300 is the master controller for the second logical router 1210, the controller generates a new dynamic route for the logical router 1210, and modifies the data structure 1355 stored for the logical router 1210 in the stage storage 1310, as shown by the encircled 4. The table mapping engine 1315 modifies the input set of routes for the data structure 1355 by, e.g., creating a new route object for the generated dynamic route.

In addition to generating the dynamic route for the second logical router 1210, the table mapping engine 1315 processes the new input route for the first logical router 1205. Rather than computing state (e.g., flow entries, etc.) for the first logical router 1205, the table mapping engine 1315 passes the route data to the route processing engine 1320, as shown by the encircled 5.

The route processing engine 1320 performs a route selection and traversal operation in order to identify the output routing table for the logical router. In some embodiments, the route processing engine 1320 takes as input each new or modified route for the logical router, and outputs status data for each route. For instance, for a new static route that specifies a next hop IP address, the route processing engine determines whether to use the new route and, if in use, a final output port for the route or a final action of blackhole (i.e., drop packets) for the route. The route processing engine 1320 returns the output set of routes to the table mapping engine 1315, as shown by the encircled 6.

At this point, the table mapping engine 1315 performs several actions. The output routing data computed by the route processing engine is stored in the logical router data structure 1350, as shown by the encircled 7. This figure conceptually illustrates this data as being stored in the FIB. The conceptual RIB for input configuration data and FIB for output data represent analogies to the RIB to FIB conversion performed by physical routers in traditional networks.

The table mapping engine 1315 also generates both flow entries and configuration data using the output routing data provided by the route processing engine 1320. A route specifying that a particular network address range is routed to a particular logical port will be encoded as a match on the destination address over the network address range and an action to send the packet to the logical port, with a particular next hop IP address (in some cases, simply encoding the MAC address to which the next hop IP address corresponds into the flow entry, to avoid the need for an ARP request). In some cases, the logical router also specifies other data (e.g., routing policies, etc.) which the table mapping engine 1315 encodes in flow entries as well. Because the MFEs operate on both the VM hosts and the gateway hosts, the table mapping engine distributes the flow entries to both the host 1340 and the host 1345 through the state distribution interface 1325, as shown by the encircled 8s (though at least some of the flow entries distributed will be different between the two hosts).

In addition, because the first logical router 1210 connects to an external network, this router has a L3 gateway implemented in a namespace on the host 1345. As such, the table mapping engine 1315 uses the output routing data from the route processing engine 1320 to generate configuration data for the namespace. This configuration data, in some embodiments, (i) defines the existence of the namespace and (ii) provides configuration information for the network stack in the namespace, including the routing table. Thus, the output routing data from the route processing engine 1320 is used to generate a set of data tuples defining a routing table for the namespace that implements a L3 gateway for the logical router. This data is distributed to the gateway host 1345 through the state distribution interface 1325, as shown by the encircled 9. As described above, both the flow entry data tuples and the configuration data tuples may be distributed through a hierarchy of network controllers rather than directly from the controller 1300 to the host machines 1340 and 1345 (e.g., through two different network controllers that manage the two different host machines 1340 and 1345).

Because the table mapping engine generated a new input route for the second logical router 1210 (the dynamic route stored as shown by the encircled 4), new route traversal and data tuple generation and distribution is required for this logical router as well. As such, shown by the encircled 10, the table mapping engine retrieves the input state from the logical router object 1355. While no new routes are present that require the propagation of any dynamic routes to the first logical router 1205, the other operations described for the first logical router are performed by the network controller 1300.

The table mapping engine 1315 sends the input route data to the route processing engine 1320 (shown by the encircled 11), which returns the output route data (shown by the encircled 12). At this point, the table mapping engine stores the output routing data in the data structure 1355, as shown by the encircled 13. In addition, the flow generation module 1330 of the table mapping engine 1315 generates new flow entries for the second logical router 1210, and distributes these to the host machines 1340 and 1345 (shown by the encircled 14s). Although the second logical router does not have any gateway ports, packets could arrive at the L3 gateway on the host 1345 from an external network with a destination address of either VM 5 and VM 6. In this case, in order for the MFE at the gateway host 1345 to perform first-hop processing, it requires the flow entries for the second logical router 1210. However, no additional configuration data for a L3 gateway implemented in a namespace is distributed to any gateway host, as no gateways are present for this logical router.

Although the operations pertaining to implementing the first logical router 1205 are shown as completely preceding the operations pertaining to the second logical router 1210 (other than the dynamic route propagation), one of ordinary skill in the art will recognize that these operations may be performed simultaneously, or in overlapping fashion. For instance, the table mapping engine might process the output data from the route processing engine in order to generate flow entries and configuration data for the first logical router while the route processing engine performs route traversal for the second logical router.

Whereas FIG. 13 illustrates the case in which the controller 1300 is the master of both logical routers, FIG. 14 conceptually illustrates two network controllers 1400 and 1450, which are respectively the master controllers for the first and second logical routers 1205 and 1210, as well as the data flow through the controllers upon receipt at the first controller 1400 of a new route for the first logical router 1205. The first network controller 1400 includes an API 1405, a state storage 1410, a table mapping engine 1415, a route processing engine 1420, a state distribution interface 1425, and a controller-to-controller interface 1430. Similarly, the second network controller 1450 includes an API 1455, a state storage 1460, a table mapping engine 1465, a route processing engine 1420, a state distribution interface 1475, and a controller-to-controller interface 1480.

Most of the illustrated components perform the same functions as those described above for the network controller 1300 in FIG. 13. The controller-to-controller interfaces 1430 and 1480 enable the exchange of configuration state data between the controllers 1400 and 1450. In some embodiments, controllers exchange only configuration state (i.e., state received through the API), and do not exchange computed state (e.g., dynamic routes or other information generated by the table mapping engine, flow entries and configuration data, etc.). The controller-controller interfaces 1430 and 1480, in some embodiments, are RPC interfaces for communicating over a RPC channel.

The data flow through the network controllers 1400 and 1450 begins in a similar way to the operations shown for FIG. 13. As shown by the encircled 1 and 2, the API 1405 of the first controller 1400 receives new route information (e.g., a static route, a new logical port) for the first logical router 1205, and stores this information in the input route information of the logical router object 1445.

Because this information is new configuration state data, the controller 1400 automatically shares the change to the logical router object 1445 with the controller 1450, through a communication over the controller-controller interfaces 1430 and 1480 (shown by the encircled 3). As a result, the newly received data for the logical router 1210 is stored in the copy of the logical router object 1445 stored in the state storage 1460.

At the first controller 1400, the table mapping engine 1415 retrieves the updated data from the input set of routes for the first logical router 1205 from the state storage 1410 (shown by the encircled 4), but does not compute any dynamic routes for the second logical router 1210, as this controller is not the master of the second logical router. Instead, the table mapping engine 1415 performs the processing for the first logical router 1205, sending the data to the route processing engine 1420 and receiving the output route information back (shown by the encircled 5 and 6), then storing this data in the logical router object 1445 (shown by the encircled 7) and generates flow entry data and configuration data for distribution to the host machines 1435 and 1440 (shown by the encircled 8 and 9).

Correspondingly, at the second controller 1450, the table mapping engine 1465 retrieves the updated data from the input set of routes for the first logical router as well (shown by the encircled 10). Although the table mapping engine 1465 does not perform any route processing or flow generation for the first router, the table mapping engine 1465 does propagate the new route to the input routing table of the second logical router 1210 and store this in the object 1485 for the second logical router 1210. (shown by the encircled 11)

At this point, as the input routing data for the second logical router has changed, the table mapping engine 1465 retrieves this data from the state storage 1460 (shown by the encircled 12). The table mapping engine 1465 sends this input routing data to the route processing engine 1470 and receives output routing data in return (as shown by the encircled 13 and 14). Finally, the table mapping engine stores this data in the logical router object 1485 (shown by the encircled 15) and generates and distributes flow entries for the second logical router 1210 (shown by the encircled 16). For the reasons described above by reference to FIG. 13, the controller 1450 distributes flow entries to both the appropriate VM hosts 1435 and gateway hosts 1440.

Figure 15:
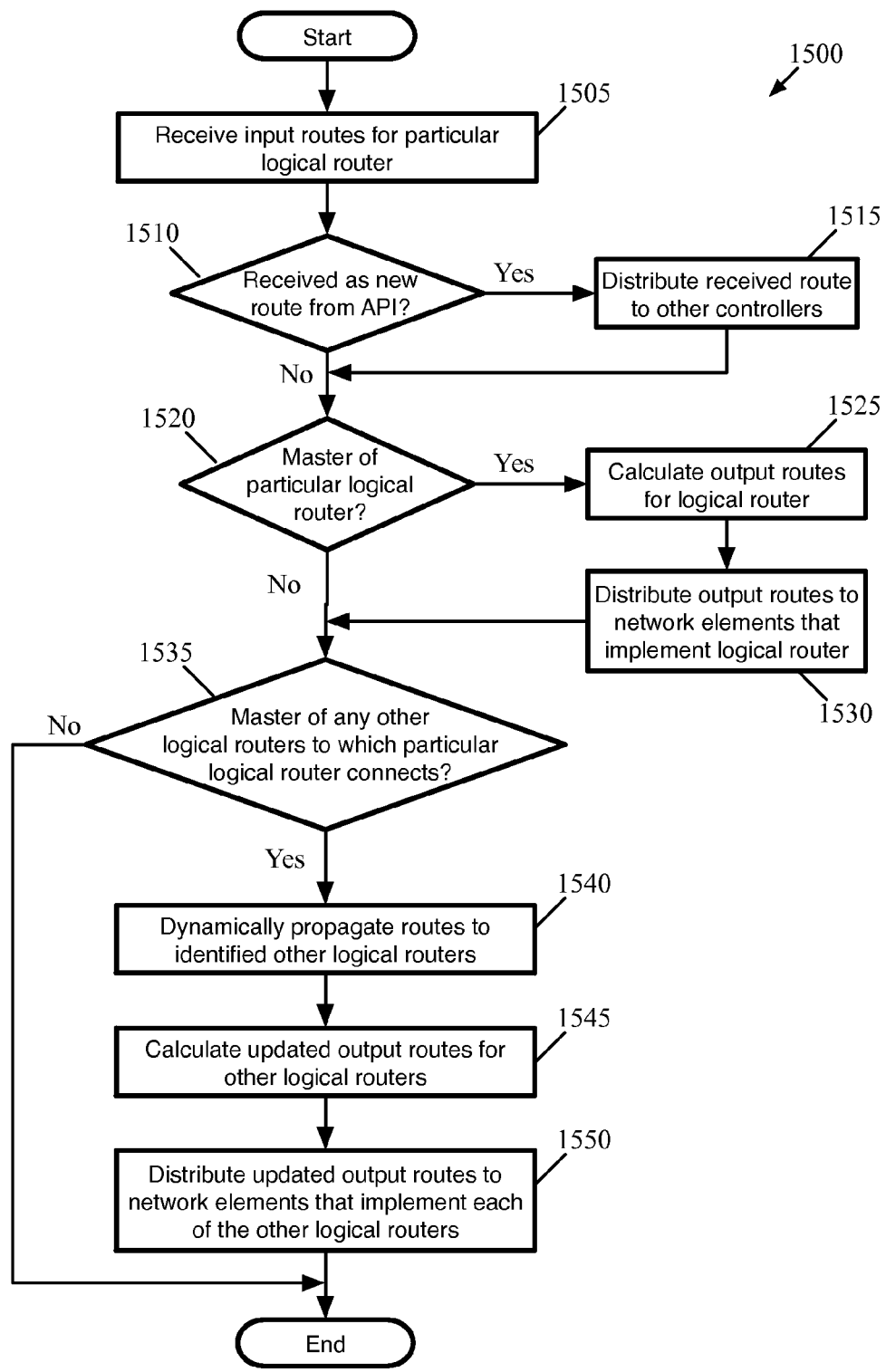
FIG. 15 conceptually illustrates a process performed by a network controller of some embodiments to process a new input route for a logical router received at the controller.

The above figures conceptually illustrate the data flow through the network controller (or controllers) to perform dynamic routing (and other logical router-related operations). FIG. 15 conceptually illustrates a process 1500 performed by a network controller of some embodiments to process a new input route for a logical router received at the controller. Various different operations of the process 1500 may be performed by different modules of the network controller (e.g., the API, the table mapping engine, etc.).

As shown, the process 1500 begins (at 1505) by receiving input routes for a particular logical router. These input routes may be received through the API at the network controller (e.g., via a communication from a cloud management application, or a direct communication from a network administrator logging into the controller), or via a state sharing mechanism from another network controller (e.g., RPC channel) in the same network control system (e.g., managing the same datacenter). The received set of input routes might be one or more static route configurations, the configuration of one or more logical ports for the logical router (e.g., to create a new logical port, to change the interface to which a logical port connects, etc.) that causes the automatic creation of new connected routes, etc.

The process then determines (at 1510) whether the new route was received through the API, or whether the route was received via the state sharing mechanism from another controller. When the route is received through the API, the process distributes (at 1515) the route to other network controllers with which the controller shares configuration state data. In some embodiments, network controllers in a cluster operate in a fully connected mesh, and therefore when one controller receives configuration state through its API, that controller shares the data with each of the other controllers in the cluster. As such, if a first controller receives configuration data from a second controller, then the first controller need not re-share the configuration state. For controllers interconnected differently in a network control system, different variations on the process 1500 may be used in order to ensure that all controllers receive the input configuration state.

After sharing the input data as required, the process 1500 determines (at 1520) whether the controller (that performs the process 1500) is the master of the particular logical router. In some embodiments, this operation is performed by the table mapping engine of the controller. When the table mapping engine retrieves new configuration data, the engine performs an operation to determine whether the configuration data is for a logical forwarding element (identified, e.g., by its UUID) for which the controller is a master. When the controller is not the master of the particular logical router, the process proceeds to operation 1535, described below.

When the controller is a master of the particular logical router for which the input configuration data is received, the process calculates (at 1525) output routes for the logical router. In some embodiments, as shown in the previous FIGS. 13 and 14, the output routes are calculated by the route processing engine, which performs a recursive route traversal operation to identify the output routes. For instance, if a new static route to a particular next hop network address is received, the route processing engine identifies either an output logical port for the route or a drop action by traversing through the other routes specified for the particular logical router.

After calculating the output routes, the process 1500 distributes (at 1530) the output routes to the network elements that implement the particular logical router. As described above, in some embodiments this entails computing data tuples for both flow entries to provide to the managed forwarding elements at the VM host machines and the gateway host machines and configuration data to provide to the gateway host machines for the namespaces operating as L3 gateways on those host machines (when the particular logical router has one or more L3 gateways). After computing the data tuples, the controller distributes the data, either directly to the host machines or through a set of network controllers (e.g., the hierarchical network control system described above by reference to FIG. 4).

Next, the process determines (at 1535) whether the controller performing the process is a master of any other logical routers to which the particular logical router connects. As shown in FIG. 2 or 12, two logical routers may be connected within a logical network. In some cases, different controllers will be the masters of the different logical routers within a logical network, or a PLR and TLR will have different master controllers. When either the particular logical router does not connect to any other logical routers (in which case no dynamic routing needs to be performed), or the controller is not the master of any logical routers to which the particular logical router connects, the process ends without performing any dynamic routing.

When the controller is the master for at least one logical router that connects to the particular logical router for which the new route information was received, the process dynamically propagates (at 1540) the new route information to each of these other logical routers (for which it is the master). In some cases, the particular logical router might connect to multiple other logical routers to which it propagates routes, but the present controller is only the master of one of these routers, in which case it handles the propagation of the routes to that logical router while a different controller handles the propagation of the routes to another logical router.

For a second logical router connected to the particular logical router, when the new route information for the particular logical router is a static route that lists a next hop address other than the address of the port of the second logical router to which the particular logical router connects, the process propagates the static route to the second logical router. If the new route is a connected route for a prefix other than that to which both of the logical routers connect in order to connect with each other, then the process propagates the dynamic route to the second logical router. For either of these cases, the next hop network address for the dynamic route is that of the port of the particular logical router to which the second logical router connects. In addition, when propagating a static route, some embodiments provide additional route length information for use in performing route traversal. In traditional BGP, advertised routes may include a number of the autonomous systems that a packet will travel through when following a particular route. Similarly, when dynamically propagating routes, some embodiments provide at least an indication as to whether the route being propagated is a connected route or a static route that sends packets either to a L3 gateway or another logical router. In the latter case, the logical router that receives the dynamic routes may have a different, more direct way of reaching the routed prefix.

After propagating the routes to the other logical routers, the process 1500 calculates (at 1545) updated output routes for the other logical routers. In some embodiments, as shown in the previous FIGS. 13 and 14, the output routes are calculated by the route processing engine, which performs a recursive route traversal operation to identify the output routes. For instance, when a route is dynamically propagated to a logical router, the route processing engine identifies whether to use the dynamic route, and if using the route then identifies either an output logical port for the route or a drop action by traversing through the other routes specified for the particular logical router.

After calculating the output routes, the process 1500 distributes (at 1550) the output routes to the network elements that implement the particular logical router. As described above, in some embodiments this entails computing data tuples for both flow entries to provide to the managed forwarding elements at the VM host machines and the gateway host machines and configuration data to provide to the gateway host machines for the namespaces operating as L3 gateways on those host machines (when the particular logical router has one or more L3 gateways). After computing the data tuples, the controller distributes the data, either directly to the host machines or through a set of network controllers (e.g., the hierarchical network control system described above by reference to FIG. 4). The process then ends.

Figure 16:
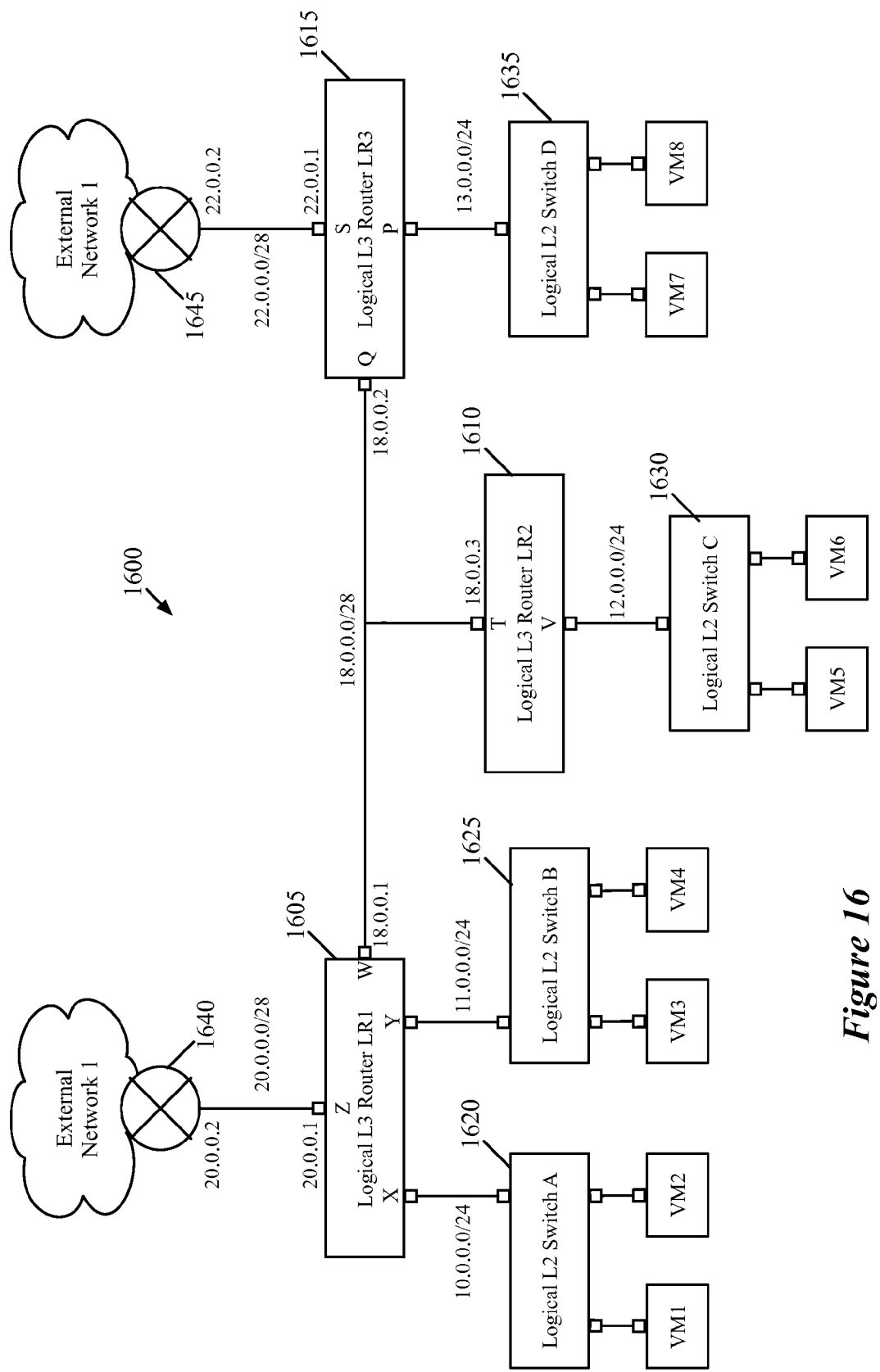
FIG. 16 conceptually illustrates a logical network, which includes three logical routers, all of which connect on the same subnet.
Figure 17:
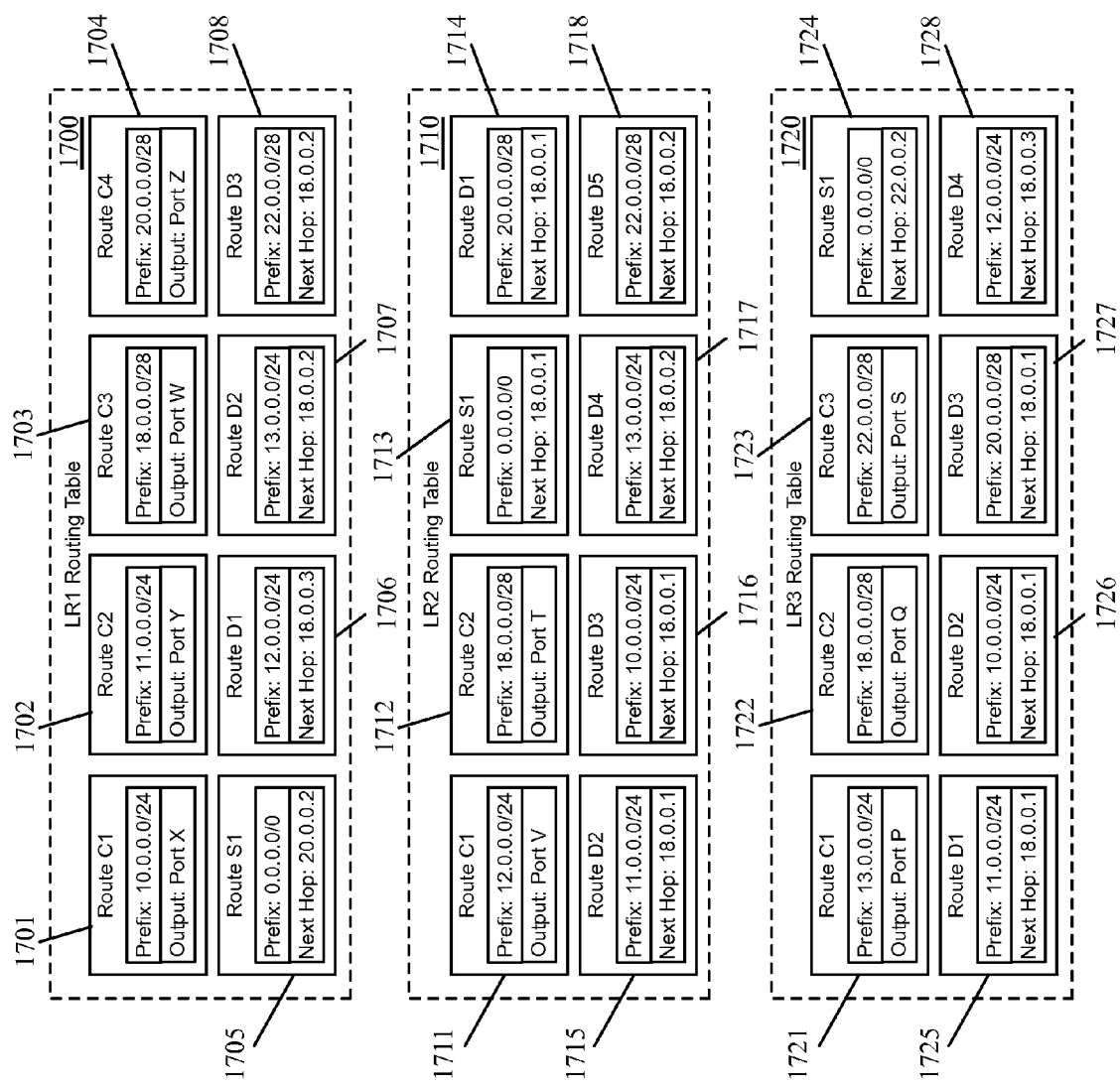
FIG. 17 reflects the initial routing tables for the three logical routers of FIG. 16, after their respective master controllers have (i) generated connected routes for each logical router, (ii) either received or generated a static default route for each logical router, and (iii) dynamically propagated the routes between the logical routers.
Figure 18:
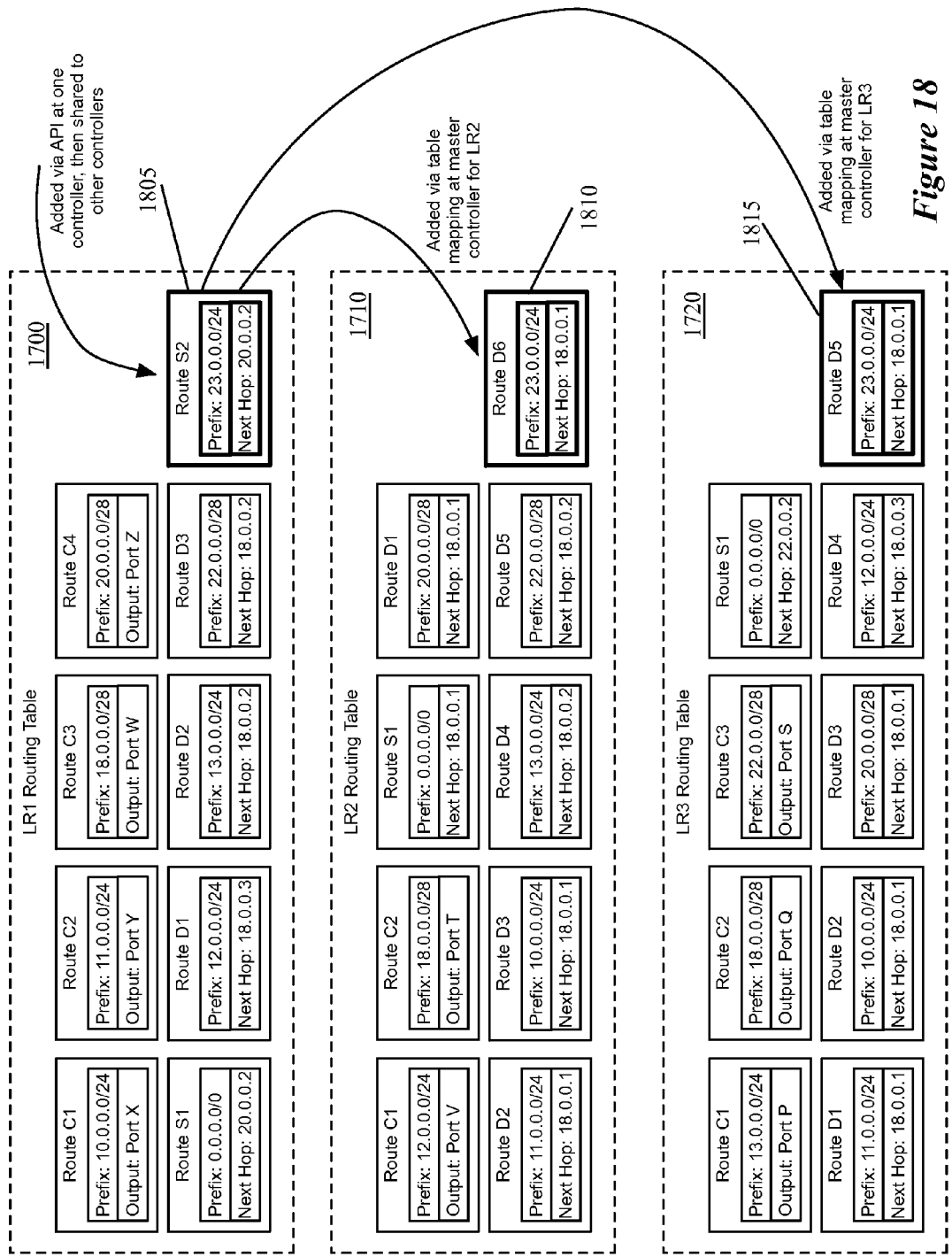
FIGS. 18 and 19 illustrate examples of the network control system receiving new static routes for one of the three logical routers of FIG. 16 and how these routes are propagated through the routing tables of FIG. 17.
Figure 19:
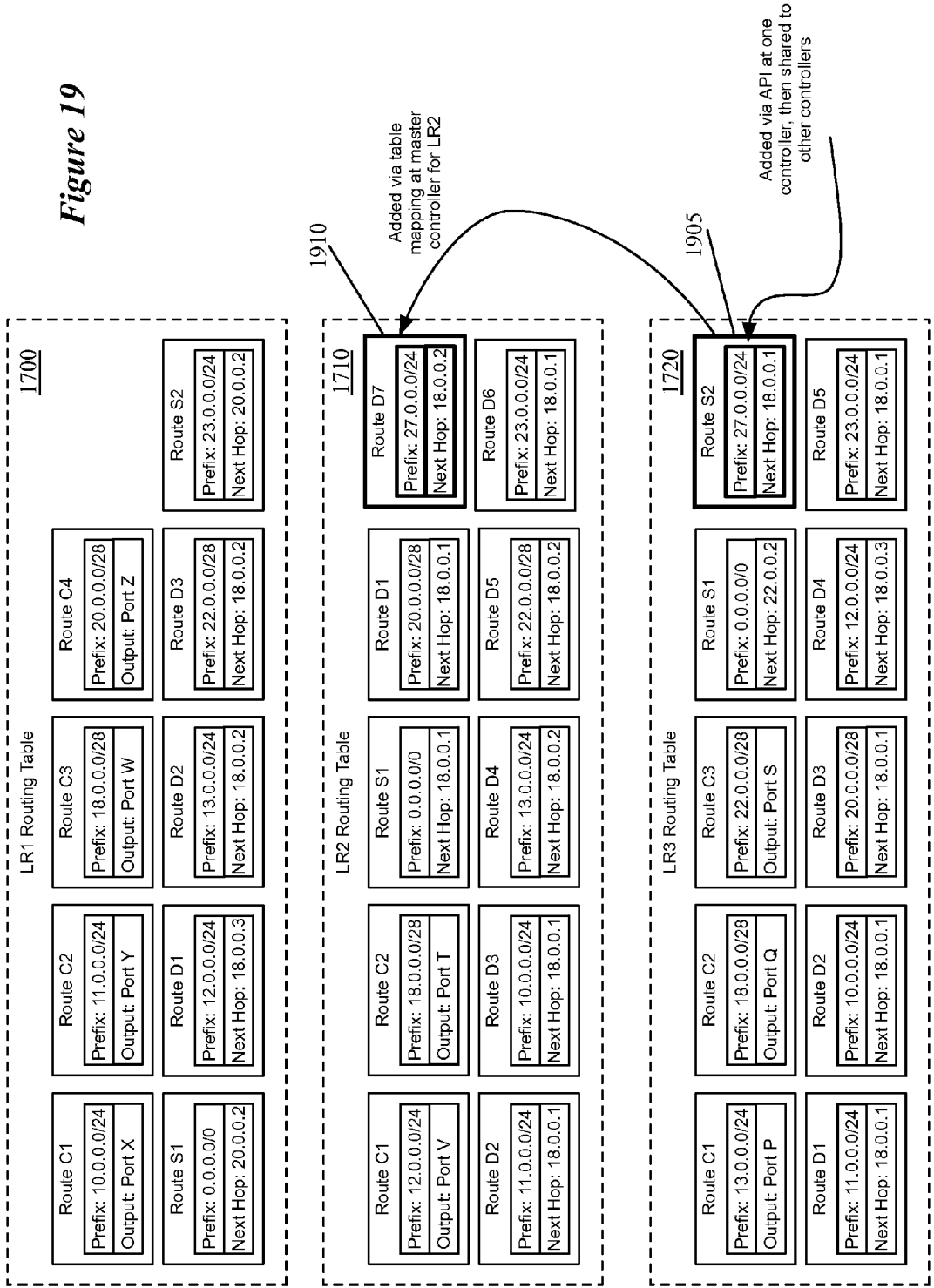

FIG. 16 conceptually illustrates a logical network, and FIGS. 17-19 illustrate the routing tables for three routers in this logical network. These examples will be used to illustrate the dynamic propagation of routes between logical routers by a network controller according to some embodiments.

As mentioned, FIG. 16 conceptually illustrates a logical network 1600, which includes three logical routers 1605-1615, all of which connect on the subnet 18.0.0.0/28. The first logical router 1605 has a port W on this subnet with an IP address of 18.0.0.1, the second logical router 1610 has a port T on this subnet with an IP address of 18.0.0.3, and the third logical router 1615 has a port Q on this subnet with an IP address of 18.0.0.2. In addition, the first logical router 1605 has two logical switches attached: a first logical switch 1620 on the subnet 10.0.0.0/24 attached to its port X and a second logical switch 1625 on the subnet 11.0.0.0/24 attached to its port Y. The second logical router 1610 has a third logical switch 1630 on the subnet 12.0.0.0/24 attached to its port V, and the third logical router 1615 has a fourth logical switch 1635 on the subnet 13.0.0.0/24 attached to its port P.

Finally, the first and third logical routers 1605 and 1615 each have one gateway port connecting to an external physical router. The first logical router 1605 has a port Z on the subnet 20.0.0.0/28 with an IP address of 20.0.0.1, which connects to an interface of a physical router 1640 with an IP address of 20.0.0.2. The second logical router 1610 has a port S on the subnet 22.0.0.0/28 with an IP address of 22.0.0.1, which connects to an interface of a physical router 1645 with an IP address of 22.0.0.2.

FIG. 17 reflects the initial routing tables 1700, 1710, and 1720 for these three logical routers 1605-1615, after their respective master controllers have (i) generated connected routes for each logical router, (ii) either received or generated a static default route for each logical router, and (iii) dynamically propagated the routes between the logical routers. The routes shown in the routing tables are the input routes (prior to the recursive route processing operation). For simplicity, these routes only show the prefix being routed and either a next hop IP address or an output port. All of the routes are assumed to allow packets with the routed prefix (rather than drop such packets), and the priorities are not listed. The type (connected, static, or dynamic) is indicated by the name of the route (e.g., C1 is a connected route, S1 is a static route, etc.).

As shown, the first routing table 1700 includes four connected routes 1701-1704, for the four logical ports of the first router 1605. Thus, for example, the first connected route 1701 specifies to send all packets with addresses matching the prefix 10.0.0.0/24 to the logical port X, while the fourth connected route specifies to send all packets with addresses matching the prefix 20.0.0.0/28 to the logical port Z (i.e., onto the external network). The second routing table 1710 includes only two connected routes 1711 and 1712, as the second logical router only has two logical ports T and V. The third routing table 1720 has three connected routes 1721-1723, for its three logical ports (one with a logical switch attached, a second connecting to the subnet with the other routers, and a third connecting to the external network.

Each of the routing tables also includes a static default route. The first routing table 1700 includes a static route 1705 that specifies to send all packets (the prefix 0.0.0.0/0) to the next hop 20.0.0.2, which is the physical router interface to which the gateway for the logical router 1605 connects on the physical network 20.0.0.0/28. Similarly, the third routing table 1720 includes a route 1724 that specifies to send all packets to the next hop 22.0.0.2, which is the physical router interface to which the gateway for the logical router 1615 connects on the physical network 22.0.0.0/28. The routing table 1710 includes a static default route 1713 that specifies 18.0.0.1 (the port W of the first logical router 1605) as the next hop IP for all otherwise unmatched packets. Thus, packets sent from VM 5 and VM 6 will be logically routed through the first logical router 1605 rather than the third logical router 1615 unless a more specific route is present.

Finally, the routing tables 1700, 1710, and 1720 each include several dynamic routes. The first routing table 1710 for the first logical router 1605 includes three dynamic routes: a first route 1706 propagated from the logical router 1610 for the prefix 12.0.0.0/24 (based on one of its connected route) with a next hop address of 18.0.0.3, and second and third dynamic routes 1707 and 1708 propagated from the third logical router 1615 for the prefixes 13.0.0.0/24 and 22.0.0.28 (based on its two connected routes), both with a next hop address of 18.0.0.2. Neither of the default routes 1713 or 1724 are propagated to the logical router 1605, as the routing table 1710 already includes a default route for the prefix 0.0.0.0/0 (some embodiments do propagate this route, but it would not be in use because of a higher priority static route already present in the routing table). Furthermore, connected routes for the subnet connecting the routers (18.0.0.0/28) are not propagated.

Similarly, the second routing table 1720 for the second logical router 1610 includes five dynamic routes. The dynamic routes 1714, 1715, and 1716 correspond to the connected routes of the first logical router 1605, while the dynamic routes 1717 and 1718 correspond to the connected routes of the third logical router 1615. For the third logical router 1615, the third routing table 1730 has four dynamic routes. The dynamic routes 1725-1727 correspond to the connected routes of the first logical router 1605, while the dynamic route 1728 corresponds to the connected route of the second logical router 1610.

Shortly after configuring the logical network as shown in FIG. 16 (and inputting the default routes shown in FIG. 17), the network control system would have generated the routing tables 1700, 1710, and 1720, and subsequently performed route processing, generated flow entries and gateway configuration data, and distributed this data to the managed forwarding elements and gateways in order to implement the logical network 1600 in a managed network.

FIGS. 18 and 19 illustrate examples of the network control system receiving new static routes for one of the three logical routers 1605-1615 and how these routes are propagated through the routing tables 1700-1720. In FIG. 18, a new static route 1805 for the first logical router 1605 is received by one of the network controllers that maintains the state data for the logical network 1600 and manages the network in which the logical network is implemented. The static route 1805 specifies to send packets matching the subnet 23.0.0.0/24 to the next hop address of 20.0.0.2. While this may seem superfluous given the default route that sends all packets 0.0.0.0/0 to this same next hop address, if the default route changes (e.g., because a second gateway port is added to the logical router 1605, the route 1805 may become important. The controller that receives the route 1805 may be the master controller that manages the first logical router 1605 or a different controller. In either case, the controller that receives the static route through its API shares the input route with the other controllers using the controller-to-controller state-sharing mechanism.

As shown, at the master controller for each of the other logical routers 1610 and 1615, this static route is propagated to the routing tables 1710 and 1720 other logical routers. Thus, the routing table 1710 for the second logical router 1610 receives a new dynamic route 1810 that specifies to send packets matching the prefix 23.0.0.0/24 to the next hop address 18.0.0.1 (the port W of logical router 1605). The routing table 1720 for the third logical router 1605 receives a similar dynamic route 1815 that also specifies to send packets matching the prefix 23.0.0.0/24 to the next hop address 18.0.0.1. As this route is more specific than its default route out the gateway port, when VM 7 or VM 8 sends a packet to an address in the subnet 23.0.0.0/24, the managed forwarding element that receives the packet will process the packet through the pipelines for both the third logical router 1615 and the first logical router 1605, and send the packet to the L3 gateway for the first logical router 1605.

In FIG. 19, a new static route 1905 is received at one of the network controllers for the third logical router 1615. The static route 1905 specifies to send packets matching the subnet 27.0.0.0/24 to the next hop 18.0.0.1 (i.e., the port W of the logical router 1605). This causes packets sent from VM 7 or VM 8 to addresses in this subnet to be processed by the first logical router 1605 and sent out the L3 gateway for the first logical router 1605, rather than out the L3 gateway of the third logical router 1615. In addition, the master controller of the second logical router 1610 propagates this route to create a new dynamic route 1910 in the routing table 1710, which specifies a next hop IP address of 18.0.0.2 (port Q of the third logical router 1615). Thus, a packet sent from VM 5 or VM 6 to an address in the subnet 27.0.0.0/24 would be processed by all three logical routers 1605-1615 at the first hop MFE before being sent out the L3 gateway of the first logical router.

In some embodiments, however, the dynamic route propagation mechanism recognize that the second logical router 1610 is on the same subnet as the first logical router 1605 and third logical router 1610, and specify for the second logical router to send packets directly to the first logical router. Alternatively, just as the route 1905 is not dynamically propagated to the routing table 1700 of the first logical router 1605 because the next hop IP address corresponds to the port of that logical router, the route 1905 is also not propagated to the routing table 1710 of the second logical router 1610 because the next hop IP is on the same subnet (18.0.0.0/28) as the port T of the second logical router.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
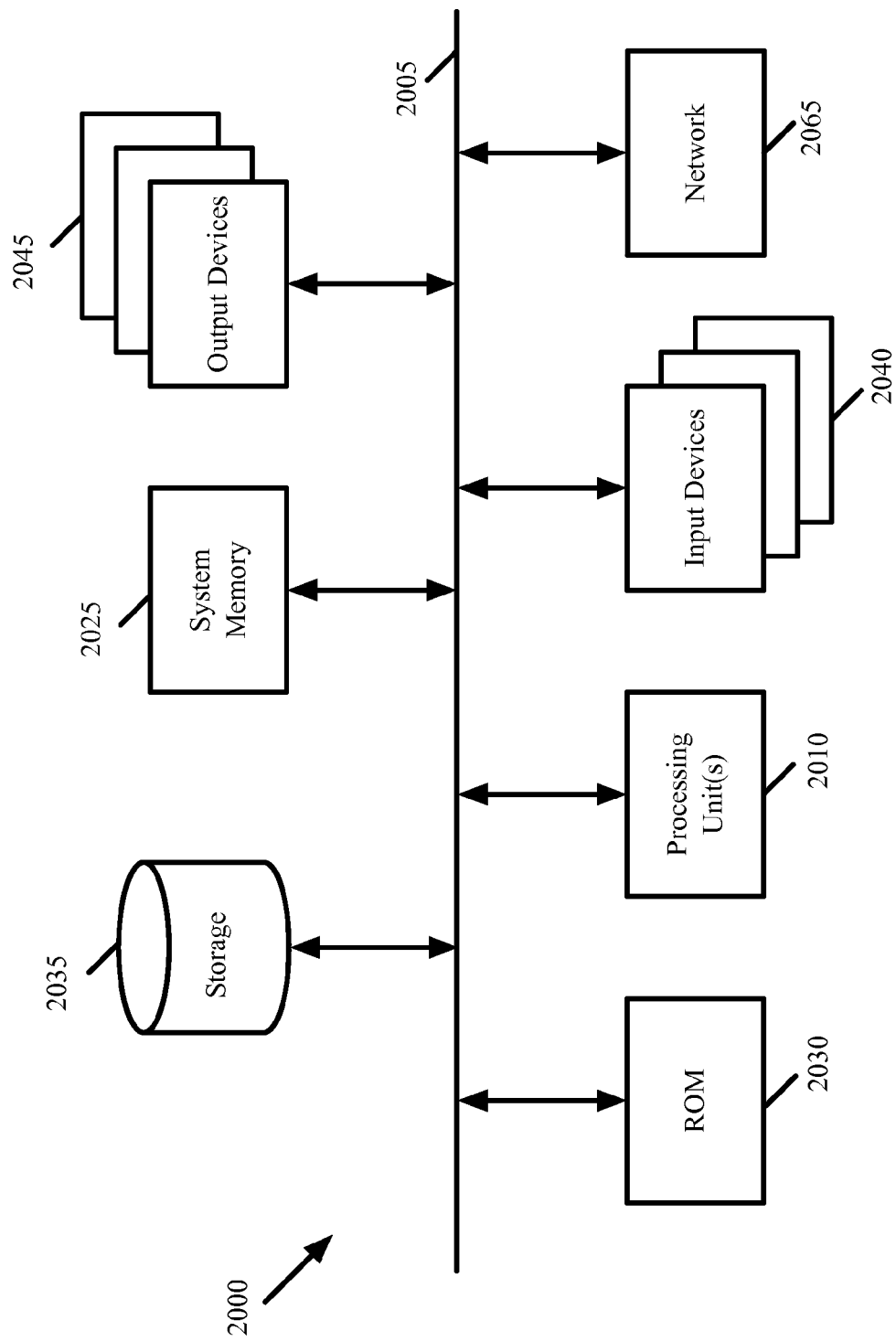
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9 and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a first logical router of a logical network that is implemented across a plurality of managed network elements, a method comprising:
    receiving input data specifying a first route for a second logical router;
    based on a connection between the first logical router and the second logical router in the logical network, dynamically generating a second route for the first logical router based on the first route; and
    distributing configuration data to implement the first logical router, including the second route, to a set of the managed network elements.

2. The method of claim 1, wherein the logical network comprises at least one logical switch to which a plurality of virtual machines (VMs) are attached, wherein the VMs reside on a plurality of host machines.

3. The method of claim 2, wherein the managed network elements comprise a plurality of managed forwarding elements that operate on the plurality of host machines, wherein the distributed configuration data comprises forwarding data for provisioning the managed forwarding elements.

4. The method of claim 3, wherein the distributed forwarding data comprises flow entries for provisioning the managed forwarding elements.

5. The method of claim 3, wherein the managed network elements further comprise at least one L3 gateway operating on a gateway host machine separate from the plurality of host machines on which the VMs reside, wherein the distributed configuration data further comprises data for configuring the L3 gateway.

6. The method of claim 5, wherein the managed network elements further comprise an additional managed forwarding element operating on each gateway host machine with a L3 gateway.

7. The method of claim 5, wherein the gateway host machine hosts a namespace operating as the L3 gateway.

8. The method of claim 1, wherein receiving the input data comprises receiving a command to create a new static route for the second logical router.

9. The method of claim 1, wherein receiving the input data comprises:
- receiving a command to create a new logical port for the second logical router, the new logical port associated with a particular subnet; and
- automatically generating a connected route for the second logical router to output packets with destination addresses in the particular subnet to the particular logical port.

10. The method of claim 9, wherein the second route for the first logical router specifies sending packets with destination addresses in the particular subnet to a next hop address of the second logical router.

11. The method of claim 1 further comprising, prior to distributing the configuration data to implement the first logical router:
- performing a route processing operation to determine a set of output routes for the first logical router based on the second route and additional input routes stored for the first logical router; and
- generating data tuples based on the set of output routes, the data tuples for distribution to the set of managed network elements.

12. A non-transitory machine readable medium storing a network controller application which when executed by at least one processing unit manages a first logical router, the network controller application comprising:
- an input interface for receiving input configuration data specifying a first route for a second logical router;
- a table mapping engine for (i) dynamically generating configuration data for a second route for the first logical router based on the first route and (ii) generating a set of data tuples to distribute to a set of managed network elements that implement the first logical router; and
- a set of data structures for storing the received input configuration data, the dynamically generated configuration data, and the set of data tuples.

13. The non-transitory machine readable medium of claim 12, wherein the input interface is an application programming interface for receiving the input configuration data as a set of commands.

14. The non-transitory machine readable medium of claim 12, wherein the input interface is further for receiving a configuration of the first and second logical routers, wherein the configuration comprises a connection of the first logical router to the second logical router.

15. The non-transitory machine readable medium of claim 12, wherein the first route specified by the input configuration data is a static route for the logical router that specifies a first next hop address for a particular network address prefix, wherein the second route specifies a second next hop address for the particular network address prefix.

16. The non-transitory machine readable medium of claim 15, wherein the second next hop address comprises an address of a logical port of the second logical router.

17. The non-transitory machine readable medium of claim 12, wherein the table mapping engine is a nLog engine for performing a plurality of database join operations in order to dynamically generate the data for the second route and generate the set of data tuples.

18. The non-transitory machine readable medium of claim 12, wherein the network controller application is a master controller for the first logical router.

19. The non-transitory machine readable medium of claim 18, wherein when the network controller application is also a master controller for the second logical router, the table mapping engine is further for generating a second set of data tuples to distribute to a second set of managed network elements that implement the second logical router.

20. The non-transitory machine readable medium of claim 18, wherein the network controller application further comprises a state-sharing interface for communicating with additional network controller applications to share received input configuration data with the additional network controller applications, wherein when the network controller application is not a master controller for the second logical router, a second table mapping engine of one of the additional network controller applications generates a second set of data tuples to distribute to a second set of managed network elements that implement the second logical router.

21. The non-transitory machine readable medium of claim 12, wherein the network controller application further comprises a route processing engine for performing a route traversal operation to generate a set of output routes for the first logical router from a set of input routes that includes the second route.

22. The non-transitory machine readable medium of claim 21, wherein the table mapping engine is further for generating the set of data tuples based on the set of output routes.

23. The non-transitory machine readable medium of claim 12, wherein the network controller application further comprises a state distribution interface for distributing the generated set of data tuples to the set of managed network elements.

* * * * *